(12) United States Patent
Kwon et al.

(10) Patent No.: US 10,321,045 B2
(45) Date of Patent: Jun. 11, 2019

(54) MOBILE TERMINAL AND METHOD FOR CONTROLLING THE SAME

(71) Applicant: LG ELECTRONICS INC., Seoul (KR)

(72) Inventors: Arim Kwon, Seoul (KR); Hyungsun Kim, Seoul (KR); Cheongha Park, Seoul (KR); Sangwoon Lee, Seoul (KR); Yoomee Song, Seoul (KR); Jungmin Park, Seoul (KR); Hyerim Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 15/087,805

(22) Filed: Mar. 31, 2016

(65) Prior Publication Data

US 2017/0034428 A1    Feb. 2, 2017

(30) Foreign Application Priority Data

Jul. 29, 2015   (KR) .......................... 10-2015-0107536

(51) Int. Cl.
*H04N 5/232*   (2006.01)
*G06F 3/0488*   (2013.01)
(Continued)

(52) U.S. Cl.
CPC ......... *H04N 5/23216* (2013.01); *G06F 3/048* (2013.01); *G06F 3/0488* (2013.01);
(Continued)

(58) Field of Classification Search
CPC ............ H04N 5/23216; H04N 5/23293; G06F 3/04817; G06F 3/048; G06F 3/0488; G06F 2203/04808; G06F 2203/04803
See application file for complete search history.

(56) References Cited

U.S. PATENT DOCUMENTS 8,111,314 B2 * 2/2012 Lee .................... H04N 1/00204
                                                348/207.99
2007/0140675 A1   6/2007 Yanagi
(Continued)

FOREIGN PATENT DOCUMENTS

| EP | 2835964 | 2/2015 |
|----|---------|--------|
| KR | 20140029827 | 3/2014 |
| KR | 20150078752 | 7/2015 |

OTHER PUBLICATIONS

European Patent Office Application Serial No. 16165030.4, Search Report dated Dec. 19, 2016, 9 pages.
(Continued)

*Primary Examiner* — Sinh Tran
*Assistant Examiner* — Tuan H Le
(74) *Attorney, Agent, or Firm* — Lee, Hong, Degerman, Kang & Waimey

(57) ABSTRACT

A mobile terminal includes: a camera; a touch screen; and a controller configured to: cause the touch screen to display an image received via the camera, the image acquired at a first magnification ratio; control the camera to change a magnification ratio from the first magnification ratio to a second magnification ratio based on a touch applied to the touch screen displaying the image; cause the touch screen to display an image acquired at the second magnification ratio; and activate a specific function if the touch is continuously applied to the touch screen displaying the image acquired at the second magnification ratio.

18 Claims, 32 Drawing Sheets

(51) Int. Cl.
*G06F 3/048* (2013.01)
*G06F 3/0481* (2013.01)

(52) U.S. Cl.
CPC ..... *G06F 3/04817* (2013.01); *H04N 5/23293* (2013.01); *G06F 2203/04803* (2013.01); *G06F 2203/04808* (2013.01)

(56) References Cited

U.S. PATENT DOCUMENTS

| | | |
|---|---|---|
| 2010/0173678 A1 | 7/2010 | Kim et al. |
| 2010/0289825 A1* | 11/2010 | Shin ............... G06F 3/04845 345/667 |
| 2011/0119619 A1 | 5/2011 | Fong et al. |
| 2012/0113216 A1 | 5/2012 | Seen et al. |
| 2012/0289290 A1 | 11/2012 | Chae et al. |
| 2012/0327172 A1* | 12/2012 | El-Saban ............ G06K 9/00228 348/14.02 |
| 2013/0265378 A1 | 10/2013 | Abuan et al. |
| 2014/0059501 A1 | 2/2014 | Yuu et al. |
| 2014/0176598 A1 | 6/2014 | Orioli et al. |
| 2016/0007008 A1* | 1/2016 | Molgaard .......... H04N 5/23212 348/47 |
| 2016/0202852 A1* | 7/2016 | Park ..................... G06F 3/0488 715/781 |
| 2016/0274737 A1* | 9/2016 | Partos .................. H04L 65/403 |

OTHER PUBLICATIONS

Raphael, "Android Intelligence; 16 cool things to try with the new Google Photos", Jun. 2015, 12 pages.
National Institute of Industrial Property of France Application No. 1653244, Office Action dated Apr. 26, 2017, 8 pages.

* cited by examiner

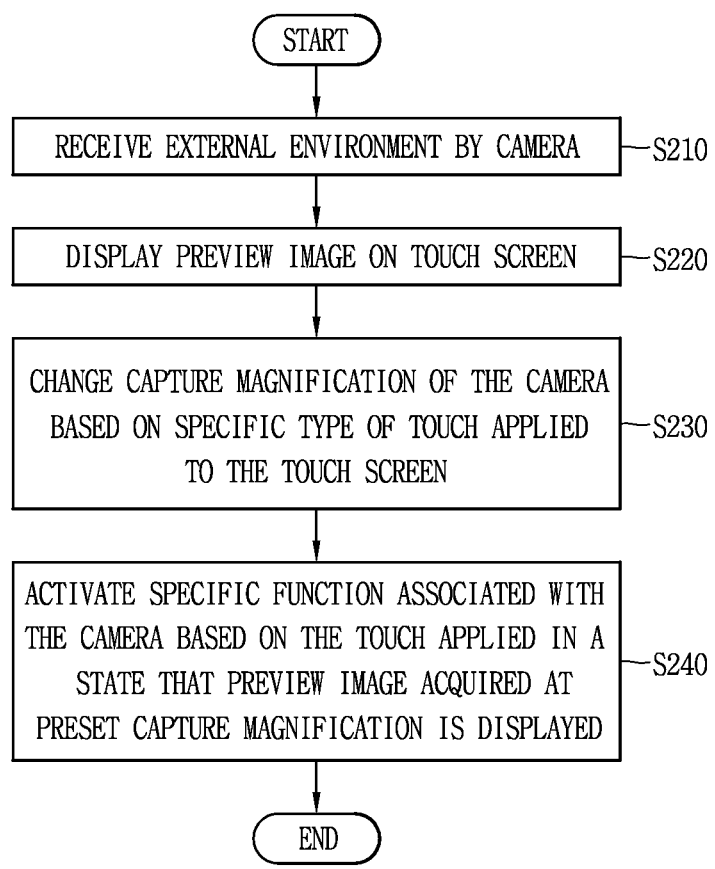

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2015-0107536, filed on Jul. 29, 2015, the contents of which are hereby incorporated by reference herein in its entirety.

BACKGROUND OF THE INVENTION

1. Field of the Invention

The present disclosure relates to a mobile terminal capable of capturing an external environment using a camera.

2. Description of the Related Art

Mobile terminals may include all types of devices configured to have a battery and a display unit, and display information on the display unit using power supplied from the battery, and formed to allow a user to hand-carry it. The mobile terminal may include a device configured to record and play a video and a device configured to display a graphic user interface (GUI), and may include a laptop computer, a portable phone, glasses, a watch, a game machine, and the like capable of displaying screen information.

As it becomes multifunctional, a mobile terminal can be allowed to capture still images or moving images, play music or video files, play games, receive broadcast and the like, so as to be implemented as an integrated multimedia player. Moreover, efforts are ongoing to support and increase the functionality of mobile terminals. Such efforts include software and hardware improvements, as well as changes and improvements in the structural components.

In recent years, as functions associated with cameras become more diversified due to the enhanced performance of cameras, a user has experienced inconvenience in carrying out a complicated process of setting or executing his or her desired functions. Furthermore, in order to edit an image or control a specific function using the image, it has a disadvantage in that the process of capturing an image should be first carried out.

SUMMARY OF THE INVENTION

Accordingly, the technical task of the present disclosure is to immediately execute a function associated with a camera in response to a specific touch applied to a touch screen displaying a preview image.

In order to accomplish the foregoing task of the present disclosure, a mobile terminal according to an embodiment may include a camera; a touch screen; and a controller configured to: cause the touch screen to display an image received via the camera, the image acquired at a first magnification ratio; control the camera to change a magnification ratio from the first magnification ratio to a second magnification ratio based on a touch applied to the touch screen displaying the image; cause the touch screen to display an image acquired at the second magnification ratio; and activate a specific function if the touch is continuously applied to the touch screen displaying the image acquired at the second magnification ratio. Accordingly, a user may execute his or her desired function in a faster manner without entering a setting change mode for setting a function associated with the camera or displaying a setting screen.

According to an example associated with the present disclosure, when the touch is continuously applied, the controller may partition the touch screen into a plurality of regions, and the controller may control screen information displayed in each of the plurality of regions independently based on an individual touch applied to a corresponding one of the plurality of regions.

According to an example associated with the present disclosure, the mobile terminal may further include a wireless communication unit, and the controller may perform wireless communication with an external device having a second camera via the wireless communication unit; cause partitioning of the touch screen to generate a plurality of regions on the touch screen in response to the continuous touch; and cause the touch screen to display the image received via the camera in a first region among the plurality of regions and to display a second image received via the second camera in a second region among the plurality of regions. Accordingly, the user may display two images received from two different cameras of two devices on the touch screen.

According to an example associated with the present disclosure, the controller may cause storing of an image displayed on the touch screen in a memory when a touch is applied to the touch screen while generating a video file with a plurality of images consecutively received the camera, thereby allowing the user to individually store the image without stopping video capture.

According to the present disclosure, a function associated with the camera may be carried out in response to a specific type of touch while displaying an image acquired through the camera without performing an additional process, thereby allowing the user to perform his or her desired function in a faster manner without switching the camera again to an inactive state.

In addition, an image to which a specific function or other information associated with the image may be provided through a plurality of capture control regions of the partitioned touch screen, thereby allowing the user to check a result of his or her desired function in advance and then control a capture operation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2A is a flow chart for explaining a control method performed a mobile terminal according to an embodiment of the present disclosure;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
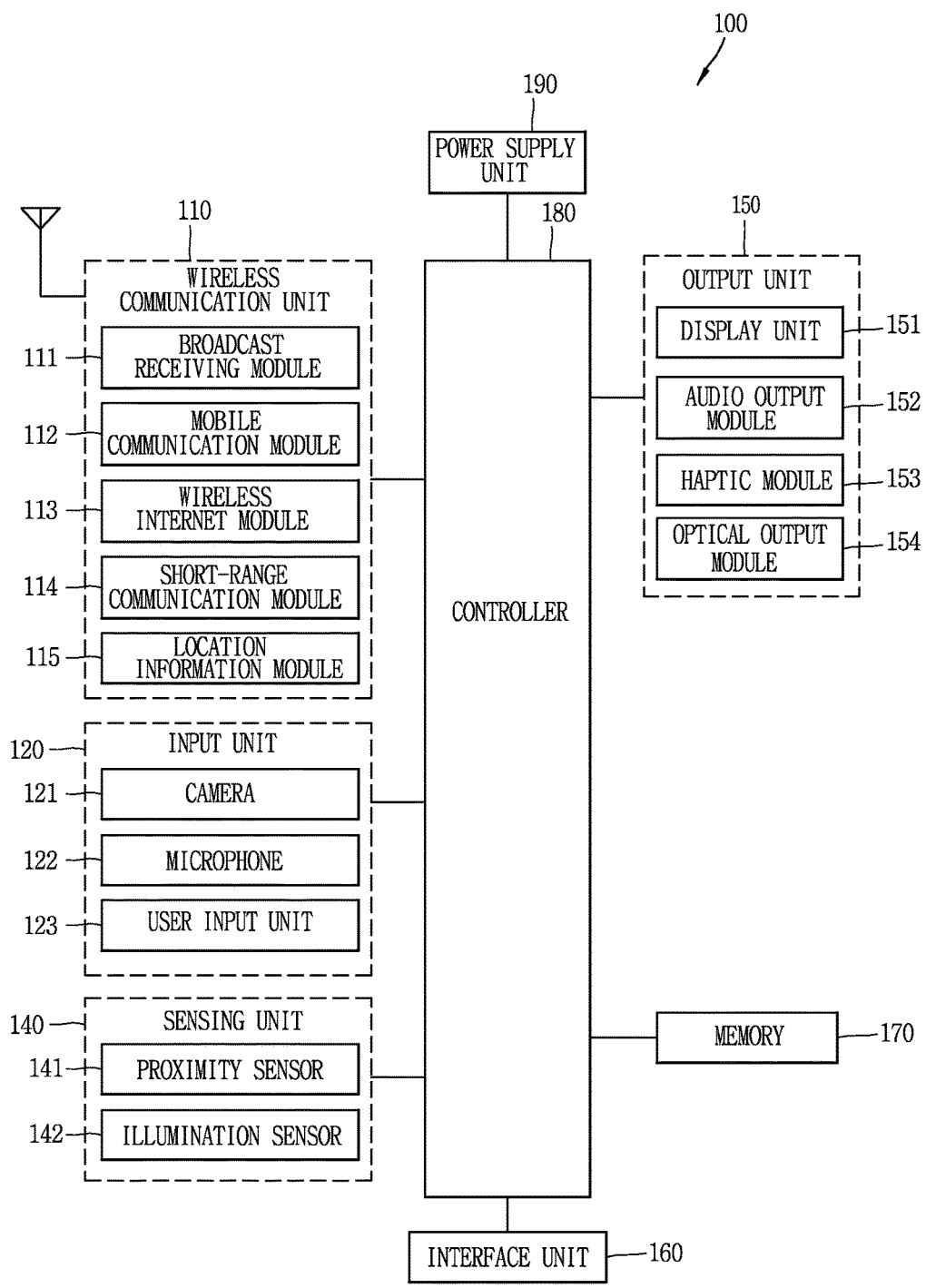
FIG. 1A is a block diagram for explaining a mobile terminal associated with the present disclosure.
Figure 1B:
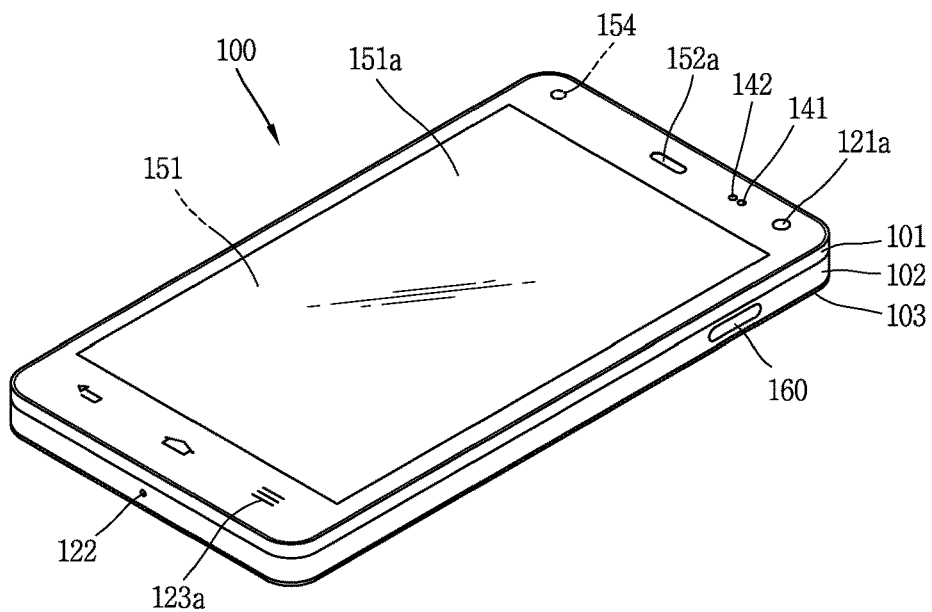
FIGS. 1B and 1C are views in which a mobile terminal associated with the present disclosure is seen from different directions.
Figure 1C:
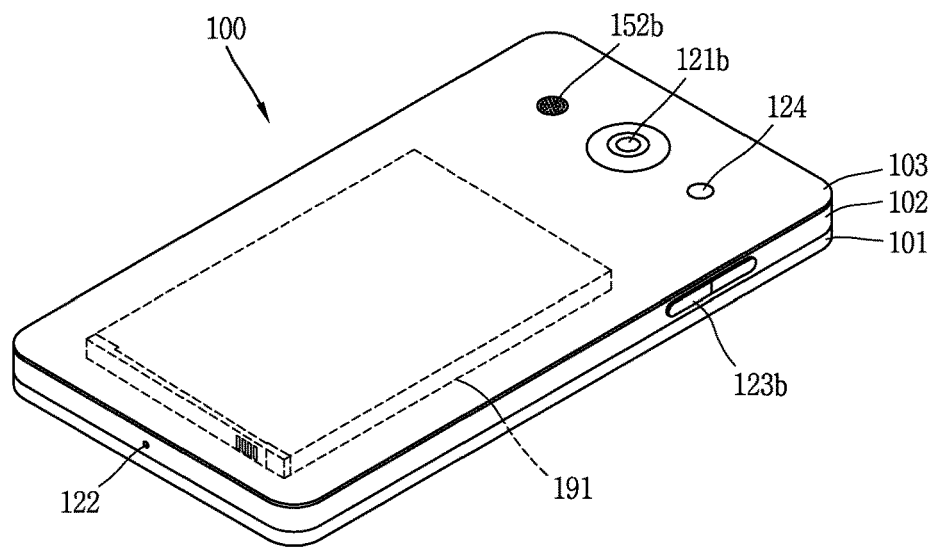

FIG. 1A is a block diagram of a mobile terminal for explaining a mobile terminal associated with the present disclosure, and FIGS. 1B and 1C are conceptual views in which an example of the mobile terminal is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal, or between the mobile terminal 100 and a network within which another mobile terminal (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone (refer to reference numeral 122), a battery gauge, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, considering the wireless communication unit 110, the broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal, or between the mobile terminal and a network where another mobile terminal (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of another module of the wireless communication unit 110 to obtain data for the position of the mobile terminal in a substitutional or additional manner. The location information module 115 may be a module used to acquire the position (or current position) of the mobile terminal, and may not be necessarily limited to a module for directly calculating or acquiring the position of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensed object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the optical sensor based on the light as a reference signal.

The camera 121 may be a type of camera sensor. The camera sensor may include at least one of a photo sensor and a laser sensor.

The camera 121 and the laser sensor may be combined to detect a touch of the sensed object with respect to a 3D stereoscopic image. The photo sensor may be laminated on the display device. The photo sensor may be configured to scan a movement of the sensed object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensed object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. For example, the stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 170 in a call signal reception mode, a call mode, a record mode, a voice recognition mode, a broadcast reception mode, and the like. The audio output module 152 may provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal 100 emits monochromatic light or light with a plurality of colors. The signal output may be terminated as the mobile terminal 100 senses that a user checks the generated event.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the mobile terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiments disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

Here, the terminal body may be understood as at least one assembly of the mobile terminal 100.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the mounted electronic components may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second user input units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first user input unit 123a are disposed on the front surface of the terminal body, the second user input unit 123b, the microphone 122 and the interface unit 160 are disposed on a side surface of the terminal body, and the second audio output module 152b and the second camera 121b are disposed on a rear surface of the terminal body, with reference to FIG. 1C.

Here, those components may not be limited to the arrangement, but be excluded or arranged on another surface if necessary. For example, the first user input unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch on the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first user input unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second user input units 123a and 123b are examples of the user input unit 123, which may be manipulated by a user to input a command for controlling the operation of the mobile terminal 100. The first and second user input units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first user input unit 123a is a touch key, but the present disclosure may not be necessarily limited to this. For example, the first user input unit 123a may be configured with a mechanical key, or a combination of a touch key and a push key.

The content received by the first and second user input units 123a and 123b may be set in various ways. For example, the first user input unit 123a may be used by the user to input a command such as menu, home key, cancel, search, or the like, and the second user input unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first user input unit 123a located on the front surface of the terminal body. Accordingly, when the first user input unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

A mobile terminal according to the present disclosure may perform wireless communication with an unmanned aerial vehicle to control a function of the unmanned aerial vehicle. Here, the unmanned aerial vehicle may be an aircraft that does not use a runway, wherein various functions such as transportation of a thing, capturing an image, low-altitude reconnaissance search can be mounted on a small-sized body formed in a relatively light weight. A mobile terminal according to the present disclosure may form a control command for controlling the flight of the unmanned aerial vehicle, and form a control command for controlling a camera configured to capture an external environment during flight among various electronic elements mounted on the unmanned aerial vehicle.

Hereinafter, a control method of controlling various functions of the unmanned aerial vehicle using the mobile terminal will be described.

Figure 2B:
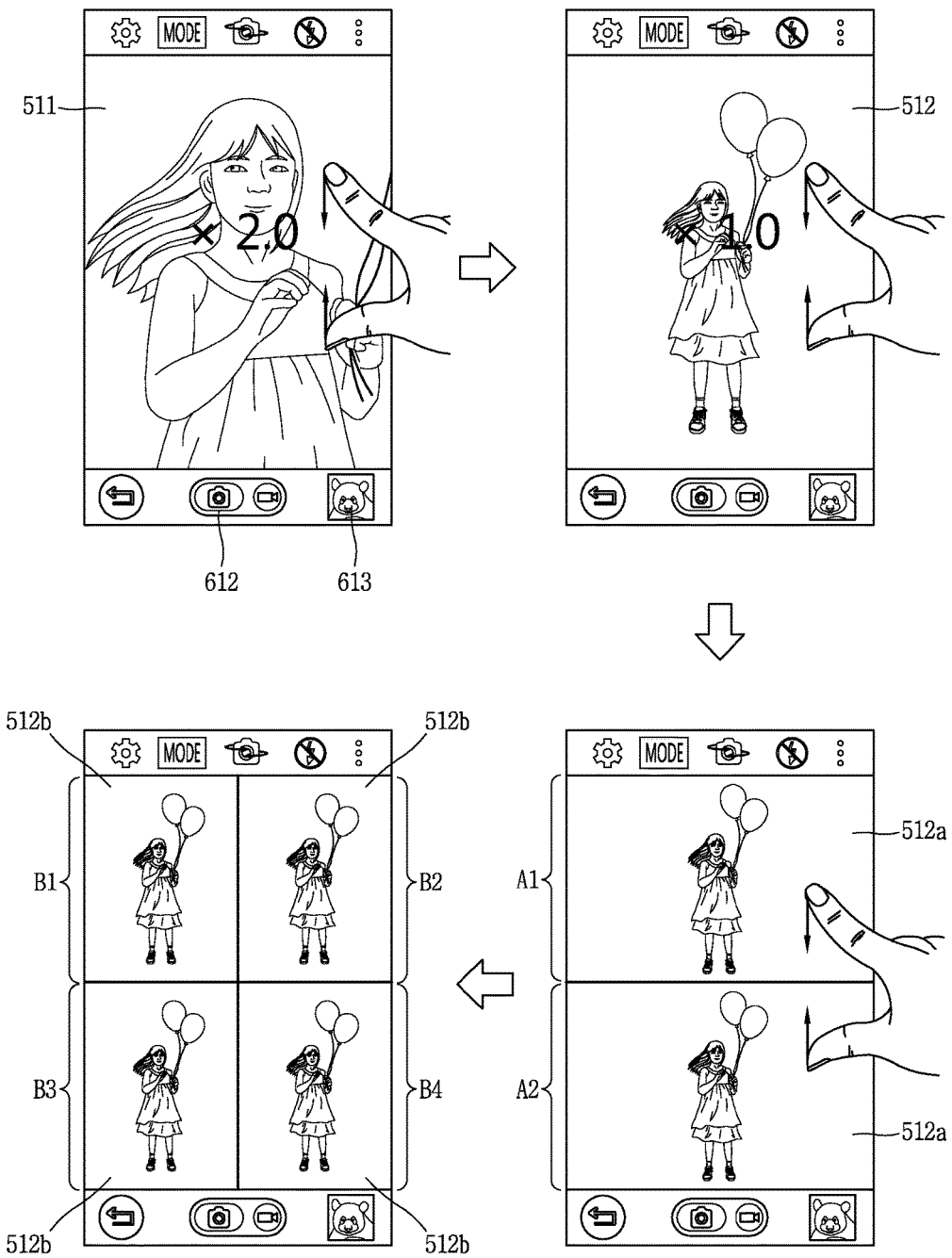
FIG. 2B is a conceptual view for explaining the control method of FIG. 2A.

FIG. 2A is a flow chart for explaining a control method performed at a mobile terminal according to an embodiment of the present disclosure, and FIG. 2B is a conceptual view for explaining the control method of FIG. 2A.

When an application associated with the camera 121 is carried out, a capture function of the camera 121 is activated, and an external environment is received by the camera 121 (S210). The display unit 151 displays a preview image 511 of the external environment (S220).

Here, a first preview image 511 corresponds to an image acquired in real time by the camera 121. A current capture magnification of the camera 121 may be displayed on the first preview image 511, for example, as "×2.0."

The preview image 511 is changed in real time by a change of the capture range, external environment, and the like of the camera 121. The controller 180 performs a zoom-in/zoom-out function of the camera 121 in response to a specific type of touch input applied to the touch screen 151, thereby displaying a preview image having an enlarged/reduced specific region. For example, the specific type of touch may correspond to a touch input in which two touch points applied to the touch screen move closer to or away from each other (pinch-in/pinch-out).

Referring to FIG. 2B, a capture magnification of the camera 121 is changed by the specific type of touch (pinch-in/pinch-out) applied to the touch screen when the first preview image 511 captured by a specific magnification of the camera 121 is displayed thereon (S230). Accordingly, the first preview image 511 is switched to a second preview image 512 in response to the specific type of touch applied to the touch screen. The second preview image 512 is an image acquired at a smaller magnification ratio (×1.0) than that (×2.0) of the first preview image 511. The first preview image 511 may include an image for a wider external environment. The controller 180 controls the display unit to display the second preview image 512 when a pinch-in type of touch is applied to the touch screen displayed with the first preview image 511, and to display the first preview image 511 again when a pinch-out type of touch is applied to the touch screen displayed with the second preview image 512.

The display unit 151 may display a capture icon 612 receiving a touch to capture and store a preview image and a gallery icon 613 for displaying previously stored images along with the preview image. When a touch is applied to the capture icon 612, the controller 180 controls the memory 170 to store a preview image at a moment at which the touch is applied thereto. Furthermore, when the preview image is stored, the preview image is displayed on the gallery icon 613. Accordingly, the user may know that the preview image has been stored by a touch of the capture icon 612. Meanwhile, subsequent to applying a touch to the capture icon 612, a preview image acquired by the camera may be continuously displayed on the touch screen or a storage image may be displayed on the touch screen.

The controller 180 may continuously control a capture magnification of the camera 121 based on a touch range in which the pinch-in and pinch-out type of touches are applied.

A specific function associated with the camera 121 is activated based on the touch applied in a state that a preview image acquired at a preset capture magnification is displayed (S240). Here, the preset capture magnification corresponds to the minimum capture magnification of the camera 121 mounted on the mobile terminal 100.

The specific function associated with the camera 121 may be set by a user. Referring to FIG. 2B, the specific function corresponds to a function of dividing the touch screen into a plurality of capture control regions.

The controller 180 divides the touch screen 151 into a first capture control region (A1) and a second capture control region (A2) based on a pinch-in type of touch applied while the second preview image 512 is displayed on the touch screen 151 due to the minimum capture magnification of the camera 121. A first thumbnail image 512*a* of the second preview image 512 acquired by the camera 121 is displayed on each of the first and second capture control regions (A1, A2). In other words, the first and second capture control regions (A1, A2) display the same preview image acquired by the camera 121. The first and second capture control regions (A1, A2) may be formed with substantially the same area, but may not be necessarily limited to this. For example, the sizes of two capture control regions may vary according to a region to which the specific type of touch is applied, a range of the specific type of touch, and the like.

When the specific type of touch (for example, pinch-in type of touch) is applied again in a state that the first thumbnail images 512*a* is displayed in each of the first and second capture control regions (A1, A2), the controller 180 divides the touch screen 151 into four capture control regions, i.e., third, fourth, fifth, and sixth capture control regions (B1, B2, B3, B4).

The touch screen 151 displays a second thumbnail image 512*b* of the second preview image on each of the third, fourth, fifth, and sixth capture control regions (B1, B2, B3, B4). When the second preview image acquired by the camera 121 is changed, the controller 180 controls the touch screen 151 to change the second thumbnail images 512*b* according to the changed second preview image. The sizes of the third, fourth, fifth, and sixth capture control regions (B1, B2, B3, B4) may be substantially the same, but may not be necessarily limited to this.

The controller 180 controls only a preview image displayed in the capture control region in an independent manner based on a control command independently applied to each of the divided capture control regions.

Figure 3A:
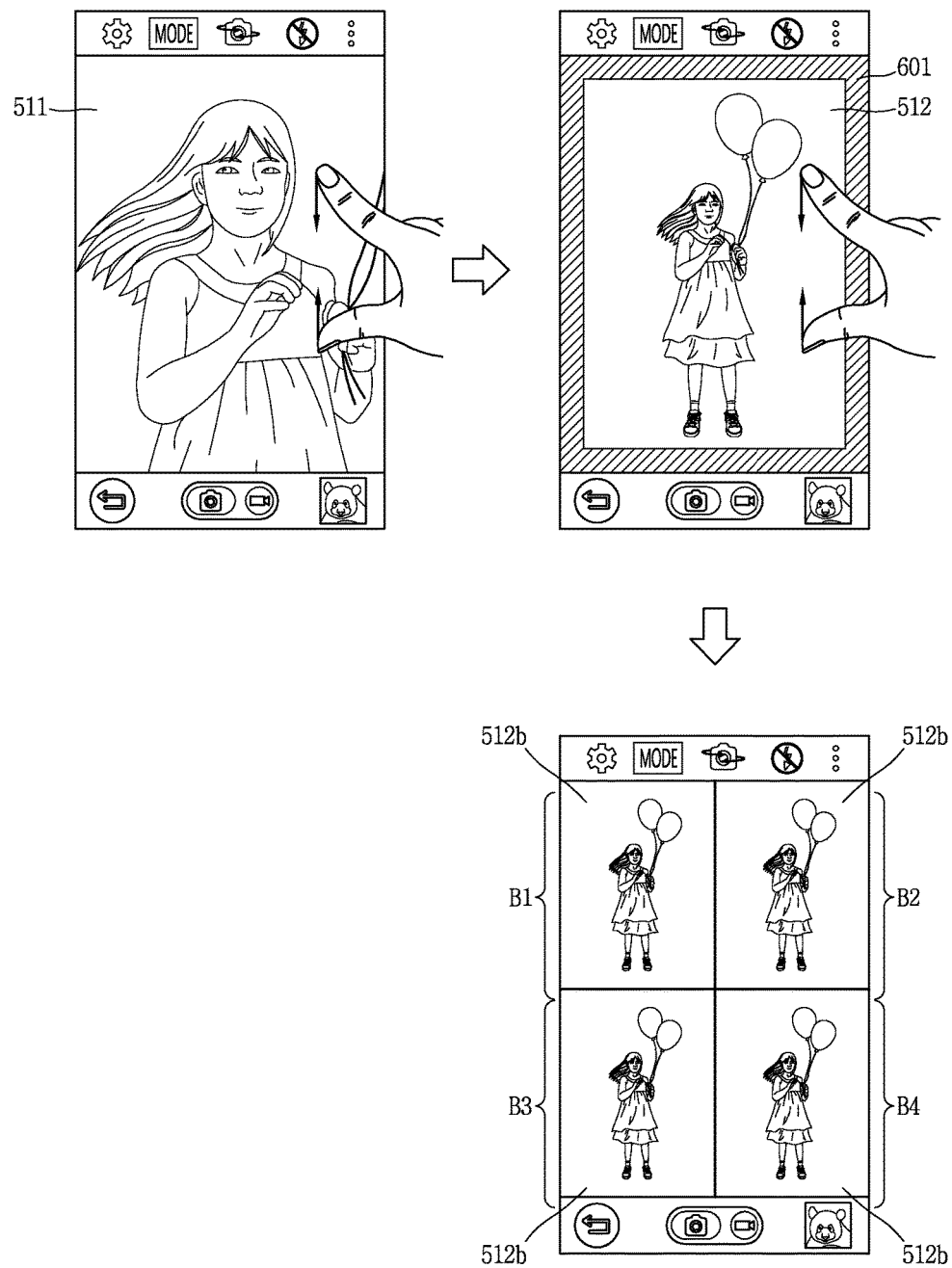
FIGS. 3A through 3C are conceptual views for explaining a method for notifying execution of a function associated with a camera based on a touch at a mobile terminal according to an embodiment of the present disclosure.
Figure 3B:
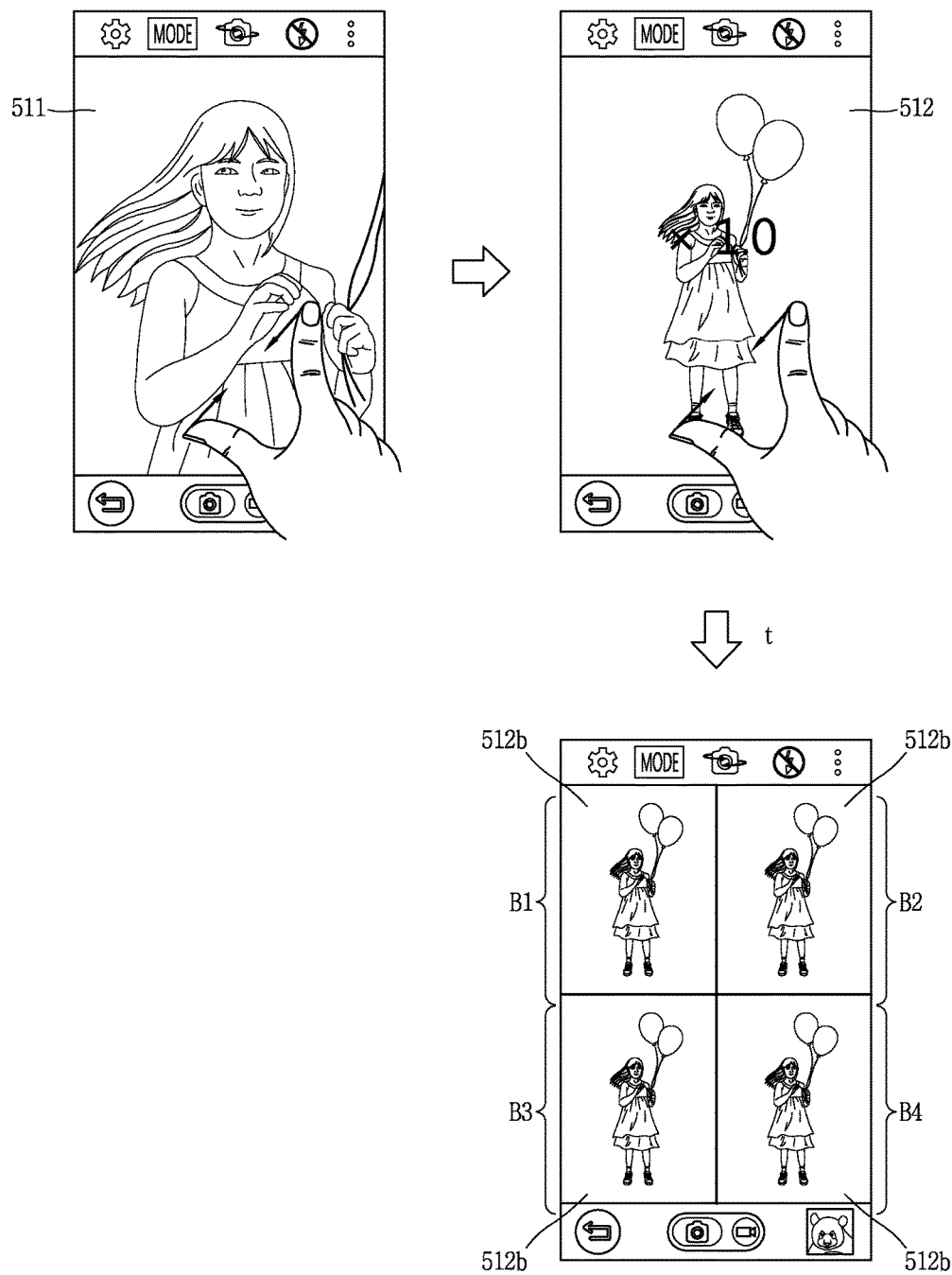
Figure 3C:
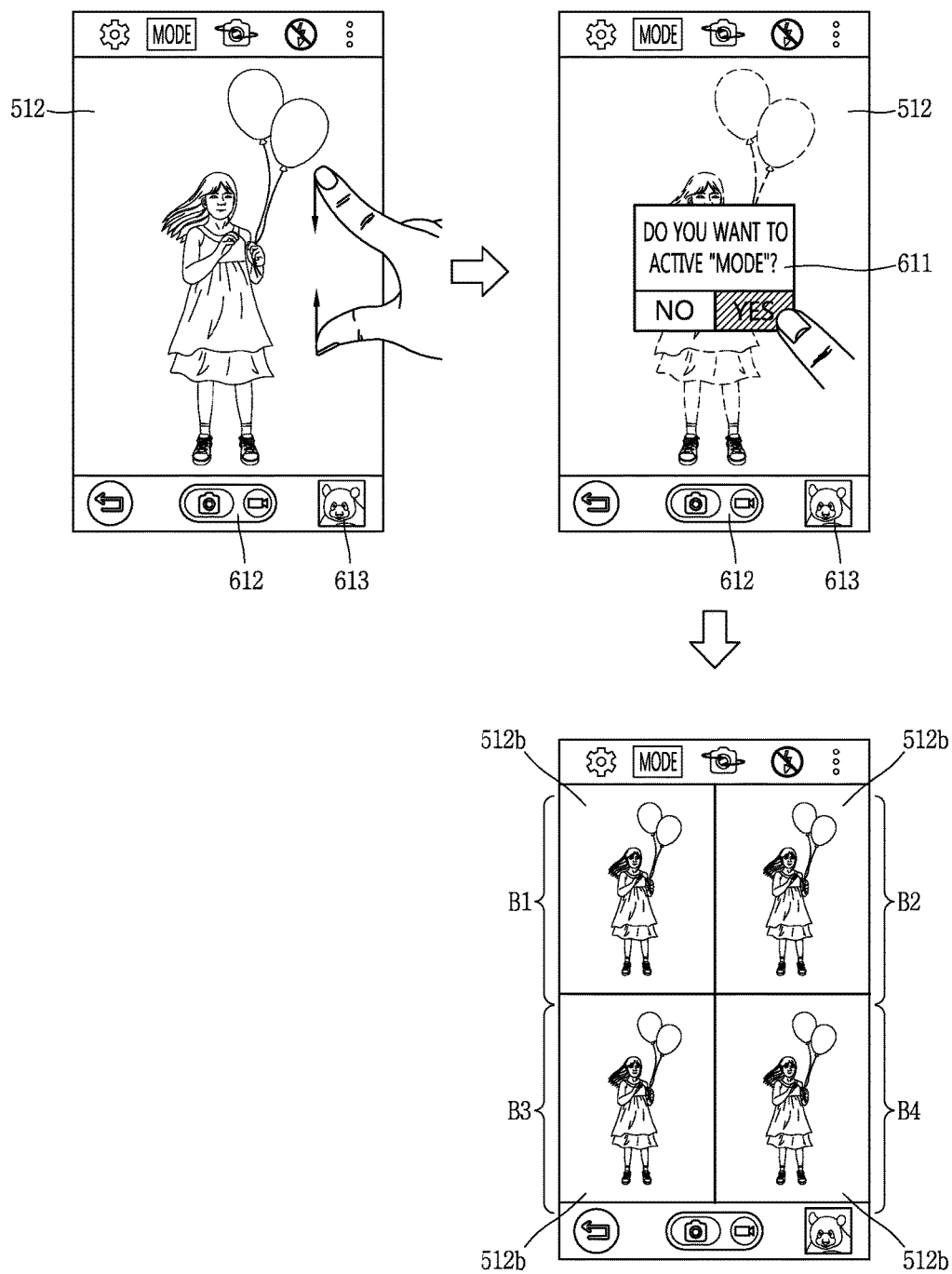

FIGS. 3A through 3C are conceptual views for explaining a method for notifying execution of a function associated with a camera 121 based on a touch.

According to the present disclosure, a specific type of touch for executing a function associated with the camera 121 is substantially the same as a specific type of touch for reducing the magnification of the camera 121 described above. However, according to the present embodiment, the execution of a function associated with the camera 121 is notified to the user by the same specific type of touch.

Referring to FIG. 3A, the touch screen 151 displays the first preview image 511. The controller 180 reduces the capture magnification of the camera 121 based on a specific type of touch applied to the first preview image 511, and displays the resultant second preview image 512. The controller 180 adjusts the capture magnification of the camera 121 based on a range of the touch. When a number of the touches increases, a variation of the changed capture magnification may increase.

When the touches are continuously sensed subsequent to switching the capture magnification to the minimum capture magnification, the controller 180 controls the touch screen 151 to display a first indicator 601 indicating the execution of a specific function associated with the camera 121. The first indicator 601 may be formed along an edge of the touch screen 151 and displayed to surround the second preview image 512.

When the specific type of touch is additionally or continuously applied in a state that the first indicator 601 is displayed, the controller 180 divides the touch screen 151 into a preset number of capture control regions (B1, B2, B3, B4). Substantially the same second thumbnail image 512*b* is displayed on each of the third, fourth, fifth, and sixth capture control regions (B1, B2, B3, B4).

In other words, when a touch is additionally or continuously applied while the first indicator 601 is displayed, the user may know that a preset function of the camera 121 is carried out. Accordingly, the user may apply a touch to divide the touch screen into capture control regions or adjust the capture magnification thereof.

Referring to FIG. 3B, the touch screen 151 displays the first preview image 511. The controller 180 reduces the capture magnification of the camera 121 based on the specific type of touch applied to the first preview image 511. The second preview image 512 is displayed based on a change of the capture magnification of the camera 121. The second preview image 512 corresponds to an image acquired based on the minimum capture magnification. Here, for example, the specific type of touch corresponds to a pinch-in touch input.

When the specific type of touch is continuously or additionally applied in a state that the second preview image 512 is displayed, the controller 180 partitions the touch screen 151 into four capture control regions, i.e., the third, fourth, fifth, and sixth capture control regions (B1, B2, B3, B4) after a preset period of time (t). Here, the preset period of time (t) may correspond to several seconds. In other words, when a control command (for example, pinch-in touch input) for reducing the capture magnification is applied after the camera 121 is set to the minimum capture magnification, the controller 180 stops the operation for a preset period of time (t) to allow the user to distinguish the reduction of the capture magnification and the partition of the touch screen.

When another control command (for example, cancel, pinch-out touch, etc.) is applied within the preset period of time (t), the controller 180 does not partition the touch screen 151. Moreover, the controller 180 may cause vibration of the mobile terminal 100 prior to the preset period of time (t) to notify partitioning of the touch screen 151.

The second thumbnail images 512*b* are displayed on the third, fourth, fifth, and sixth capture control regions (B1, B2, B3, B4).

Referring to FIG. 3C, when the specific type of touch (for example, pinch-in touch input) is applied to the touch screen 151 in a state that the second preview image 512 is displayed, the controller 180 controls the touch screen 151 to display a notification window 611. The notification window 611 may include check information for checking whether or not a mode has been carried out, a graphic image, and the like. The controller 180 may partition the touch screen 151 based on a touch applied to the notification window 611 to display a reduced preview image on each capture control region. Furthermore, the controller 180 may execute a function using the relevant second thumbnail image 512*b* based on a touch applied to a specific one of the third, fourth, fifth, and sixth capture control regions (B1, B2, B3, B4).

Alternatively, the execution of a function may be suppressed when the notification window 611 is displayed. That is, when the user does not want to execute the function, he or she may suppress the execution of the function by applying a user input via the notification window 611. In this case, the touch screen 151 continuously displays the second preview image 512 rather than partitioning the touch screen 151.

According to the present embodiment, when the capture magnification is reduced or a specific function is executable in the same touch mode, the user may distinguish two functions, thereby enhancing the user's convenience.

Figure 4A:
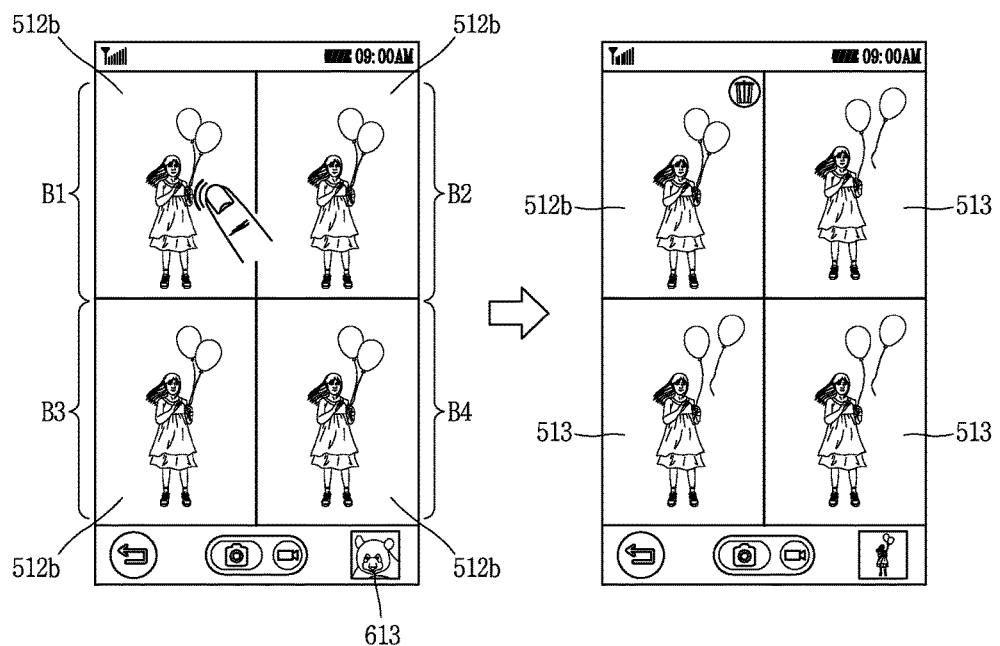
FIGS. 4A through 4C are conceptual views for explaining a method for controlling capture control regions in an independent manner at a mobile terminal according to an embodiment of the present disclosure.
Figure 4B:
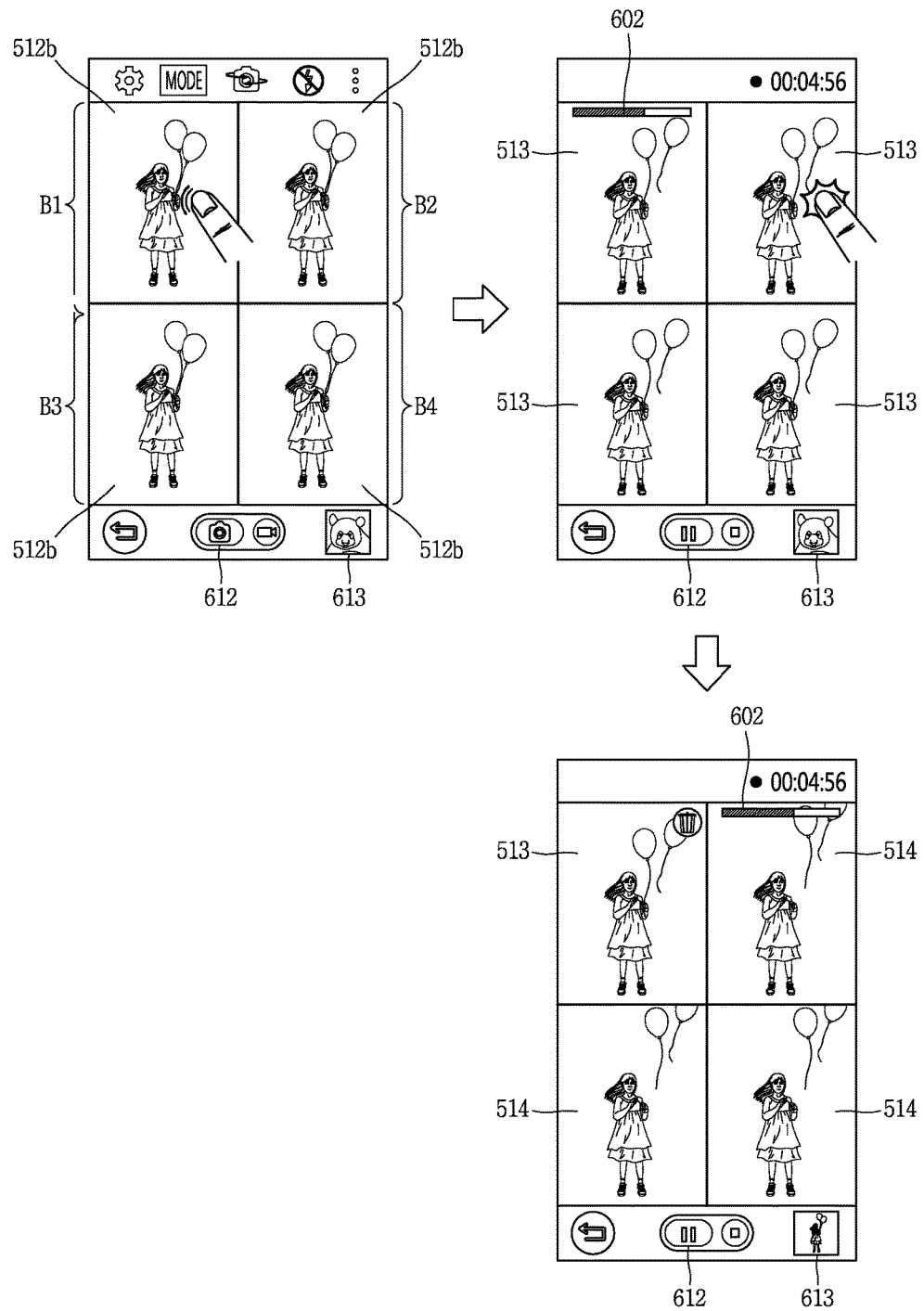
Figure 4C:
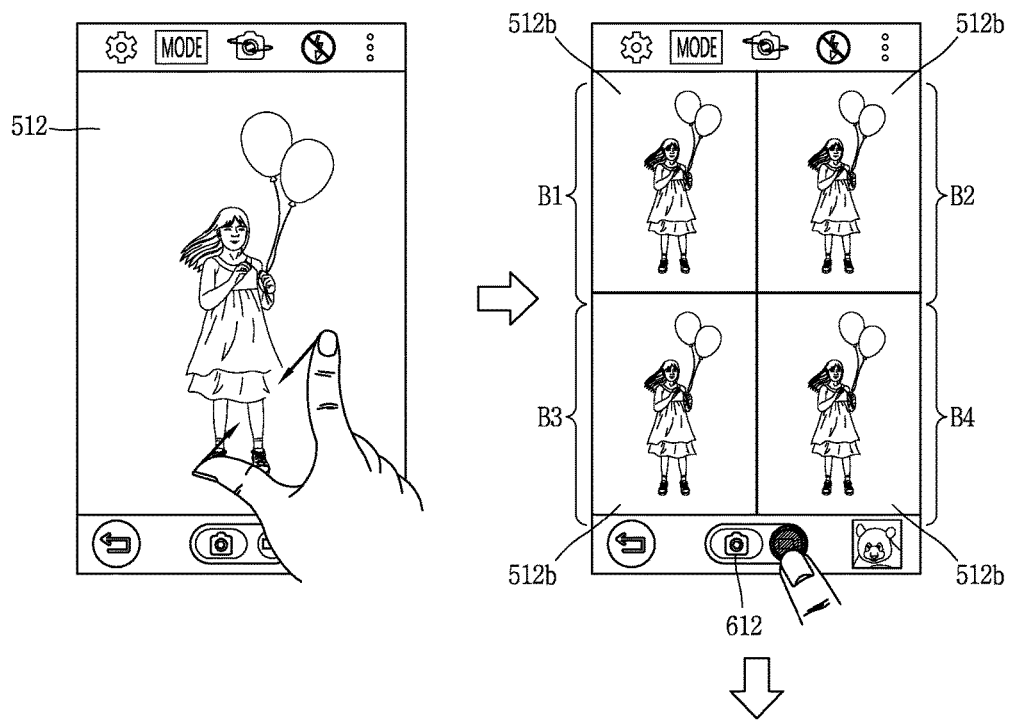
Figure 4C:
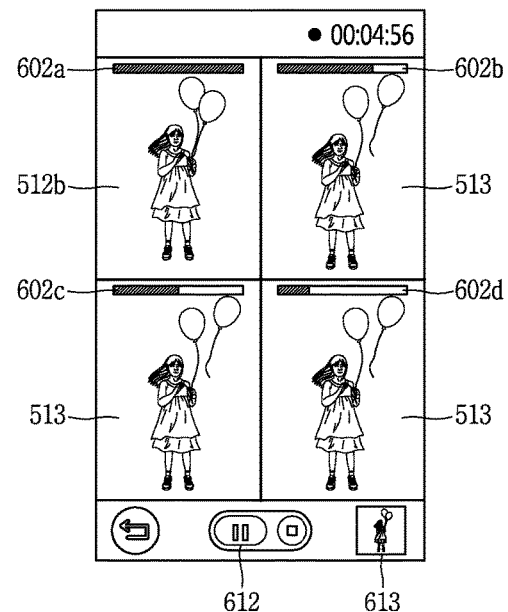

FIGS. 4A through 4C are conceptual views for explaining a method for controlling capture control regions of a touch screen.

Referring to FIG. 4A, the touch screen 151 displays the second thumbnail image 512*b* in each of the third, fourth, fifth, and sixth capture control regions (B1, B2, B3, B4). Each of the third, fourth, fifth, and sixth capture control regions (B1, B2, B3, B4) may receive an independent touch. For example, when a touch is applied to the third capture control region (B1) among the third, fourth, fifth, and sixth capture control regions (B1, B2, B3, B4), the controller 180 captures and stores the second thumbnail image 512*b* displayed in the third capture control region (B1).

The controller 180 causes the touch screen 151 to display a gallery icon 613 corresponding to the second thumbnail image 512*b* and to continuously display the second thumbnail image 512*b* in the third capture control region (B1). While the second thumbnail image 512*b* is continuously displayed in the third capture control region (B1), another preview image 513 currently sensed by the camera 121 is displayed in the fourth, fifth, and sixth capture control regions (B2, B3, B4). Furthermore, a graphic image for executing a function (for example, delete, share, etc.) for the stored second thumbnail image 512*b* may be displayed in the third capture control region (B1).

The controller 180 may apply a control command to the fourth, fifth, and sixth capture control regions (B2, B3, B4) independently from a control command applied to the third capture control region (B1). Though not shown in the drawing, for example, when a touch is applied to the fourth capture control region (B2), another preview image 513 may be captured and stored.

In other words, the user may apply a control command to any one of the divided regions to perform a capture function at a different time point, and perform another capture while continuously recognizing previously captured images.

Referring to FIG. 4B, the touch screen 151 displays the second thumbnail image 512*b* in each of the third through sixth capture control regions (B1, B2, B3, B4). Each of the third, fourth, fifth, and sixth capture control regions (B1, B2, B3, B4) may receive a touch independently. The controller 180 performs a video capture function for storing images acquired by the camera 121 according to the passage of time based on a specific type of touch applied to the third capture control region (B1). Here, the specific type of touch input may corresponds to a long touch input applied for a specific period of time.

The controller 180 controls the camera 121 and memory 170 to perform video capture from a time point at which the specific type of touch input is received. A capture bar 602 is displayed on the third capture control region (B1). The capture bar 602 indicates a capture time during which a video made of images is captured. The controller 180 may perform video capture for a preset period of time based on the specific type of touch.

While the video capture is carried out, each of the third, fourth, fifth, and sixth capture control regions (B1, B2, B3, B4) displays substantially the same preview image.

Alternatively, when the specific type of touch is applied to another capture control region other than the third capture control region (B1), for example, to the fourth capture control region (B2), the controller 180 ends the video capture in the third capture control region (B1), and performs video capture in the fourth capture control region (B2).

In this case, the third capture control region (B1) may display a preview image 513 corresponding to the captured video file, and display a graphic image 612 for controlling the video file. Furthermore, the touch screen 151 is controlled to display the gallery icon 613 including the preview image 513.

The controller 180 controls the touch screen 151 to display the capture bar 602 in the fourth capture control region (B2). While video capture is carried out by the fourth capture control region (B2), a preview image 514 displayed in each of the fourth, fifth, and sixth capture control regions (B2, B3, B4) is substantially the same.

Though not shown in the drawing, the controller 180 may end the capturing based on a touch applied to the fourth capture control region (B2).

According to the present embodiment, the user may form a plurality of video files from his or her desired time point, and the capture time point of the video file may overlap with each other. Accordingly, the user may capture a plurality of videos with various start and end points at the same time.

A method for controlling video capture according to various embodiments will be described with reference to FIG. 4C. When a specific type of touch (for example, pinch-in touch input) is applied to the touch screen 151 in a state that the second preview image 512 is displayed, the controller 180 divides the touch screen 151 into four regions, i.e., the third, fourth, fifth, and sixth capture control regions (B1, B2, B3, B4) to display the second thumbnail image 512*b* in each capture control region.

When a touch is applied to the capture icon 612 in a state that the second thumbnail image 512*b* is displayed in each of the third, fourth, fifth, and sixth capture control regions (B1, B2, B3, B4), the controller 180 performs video capture. The controller 180 controls the camera 121 and memory 170 to capture videos with different start and end points for preview images displayed in the third, fourth, fifth, and sixth capture control regions (B1, B2, B3, B4). However, the capture time may be set by a user, or determined by an additionally applied control command.

First, second, third, and fourth capture bars 602a, 602b, 602c, 602d indicating different flows of time are displayed on the third, fourth, fifth, and sixth capture control regions (B1, B2, B3, B4). Video capture using an image displayed in the third capture control region (B1) is carried out in the earliest time, and ends in the earliest time. The memory 170 may store four video files captured at different time points. Part of a plurality of images constituting each video file may overlap with each other.

When capture is ended in each capture control region, a preview image acquired by the camera 121 is not displayed. When the capture is ended, a representative image of the video file may be displayed on the gallery icon 613.

According to the present embodiment, a plurality of video files captured at different time points may be formed based on a touch applied to the capture icon 612.

Alternatively, the controller 180 controls the camera 121 and memory 170 to consecutively capture images at different time points based on a touch applied to the capture icon 612. Accordingly, the touch screen 151 may display consecutively captured images via the plurality of capture control regions.

Figure 5A:
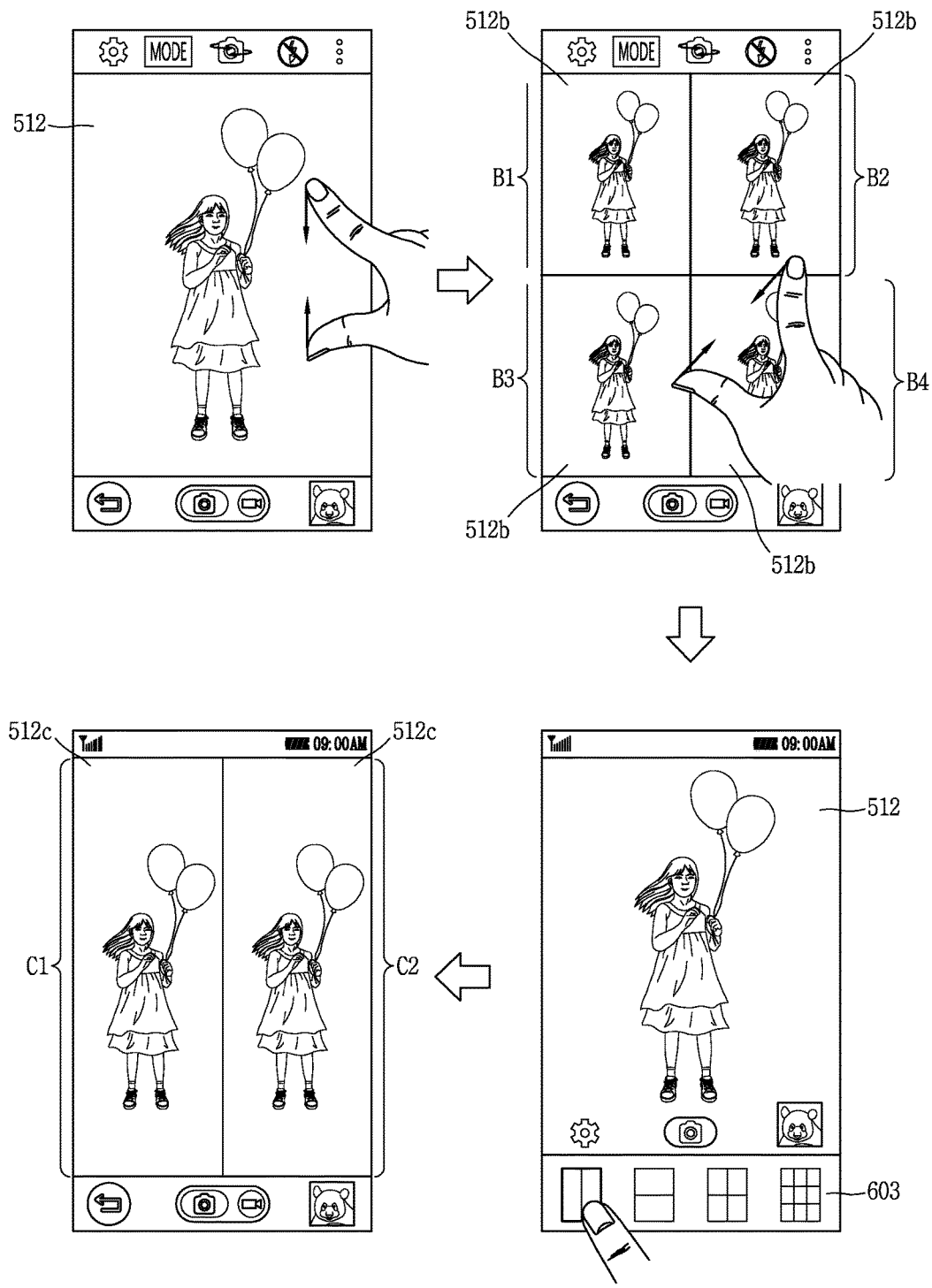
FIGS. 5A through 5C are conceptual views for explaining a method for controlling a preview image displayed on a capture control region at a mobile terminal according to an embodiment of the present disclosure.
Figure 5B:
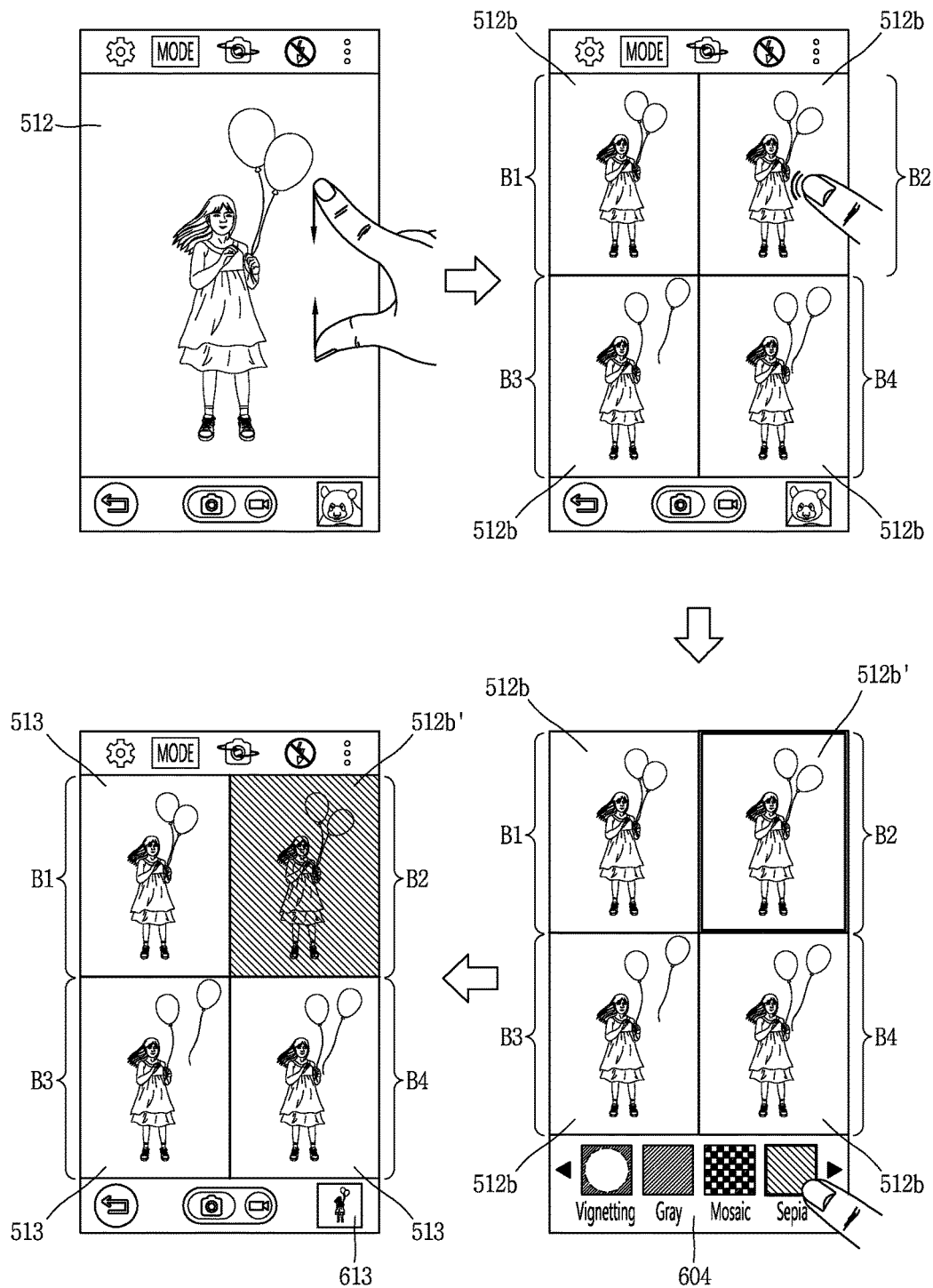
Figure 5C:
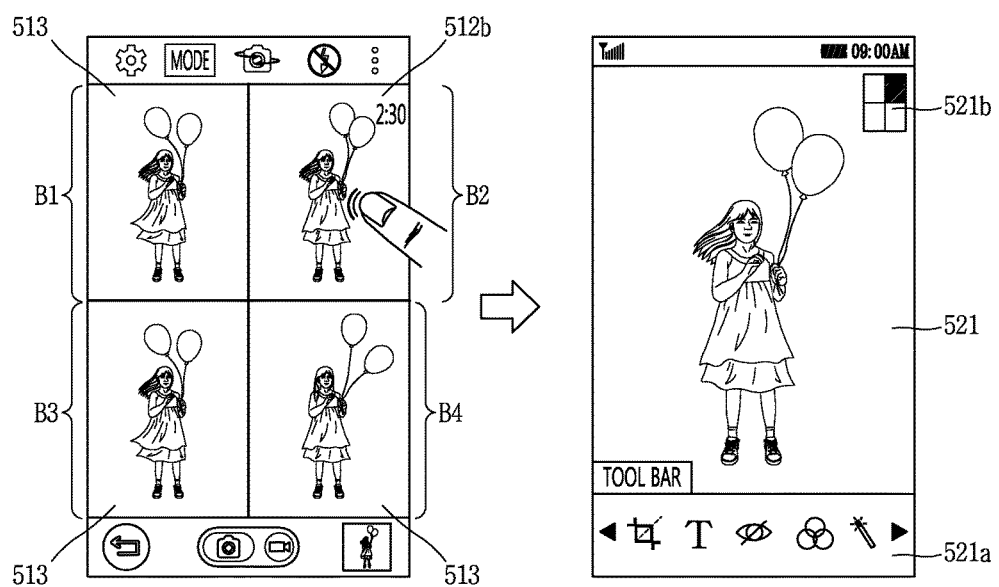

FIGS. 5A through 5C are conceptual views for explaining a method for controlling a preview image displayed on a capture control region of a touch screen.

Referring to FIG. 5A, when a specific type of touch (for example, pinch-in touch input) is applied to the second preview image 512, the controller 180 partitions the touch screen 151 into four regions, i.e., the third, fourth, fifth, and sixth capture control regions (B1, B2, B3, B4). Each of the third, fourth, fifth, and sixth capture control regions (B1, B2, B3, B4) displays the second thumbnail image 512b of the second preview image 512.

When the specific type of touch (for example, pinch-in touch input) is applied to the touch screen 151 in a state that the touch screen 151 is partitioned into the third, fourth, fifth, and sixth capture control regions (B1, B2, B3, B4), the controller 180 controls the touch screen 151 to display a frame select window 603. The touch screen 151 displays one second preview image 512 along with the frame select window 603 based on the specific type of touch.

The frame select window 603 may include a plurality of graphic images indicating a shape in which the touch screen 151 is partitioned. The controller 180 partitions the touch screen 151 based on a touch applied to one of the graphic images.

For example, the touch screen 151 may be partitioned into seventh and eighth capture control regions (C1, C2). Each of the seventh and eighth capture control regions (C1, C2) may display a third thumbnail image 512c of the second preview image 512.

In other words, the user may partition the touch screen 151 in various shapes by applying an additional touch input.

FIG. 5B illustrates a method for controlling a preview image displayed in the capture control region. The controller 180 may partition the touch screen 151 into the third, fourth, fifth, and sixth capture control region (B1, B2, B3, B4) based on a specific type of touch (pinch-in touch input) applied to the second preview image 512. Each of the third, fourth, fifth, and sixth capture control regions (B1, B2, B3, B4) displays a second thumbnail image 512b of the second preview image 512.

The controller 180 executes a function of modifying a preview image displayed in the each capture control region based on the specific type of touch. For example, the controller 180 selects one of a plurality of capture control regions based on a touch applied to the touch screen 151. For example, when a touch is applied to the fourth capture control region (B2), the touch screen 151 displays a modification select window 604. The modification select window 604 may include a plurality of graphic images for receiving a touch to modify the preview image or apply a visual effect thereon. The touch screen 151 displays the selected capture control region while the modification select window 604 is displayed. As illustrated in FIG. 5B, the fourth capture control region (B2) may be displayed in a highlighted manner.

When a touch is applied to the plurality of graphic images, the controller 180 applies a visual effect to the second thumbnail image 512b of the fourth capture control region (B2) based on the selected graphic image(s). The fourth capture control region (B2) displays a modification image 512b' of the second thumbnail image.

The controller 180 causes storing of the modification image 512b', and controls the touch screen 151 to display the gallery icon 613 indicating the modification image 512b'. While the modification image 512b' is displayed in the fourth capture control region (B2), each of the third, fifth and sixth capture control regions (B1, B3, B4) displays a preview image 513 acquired by the camera 121.

The controller 180 controls the touch screen 151 to capture a preview image based on a touch additionally applied to the third, fifth, and sixth capture control regions (B1, B3, B4) or capture the preview image in a modified manner.

According to the present embodiment, the user may capture an image displayed in each capture control region while at the same time applying a visual effect to the image to store it, and receive a preview image acquired in real time along with the image to which the visual effect is applied.

An editing method of the selected preview image will be described with reference to FIG. 5C.

The touch screen 151 may be partitioned into the third, fourth, fifth, and sixth capture control regions (B1, B2, B3, B4), and the controller 180 may control the camera 121 and memory 170 to store the image or form a video file based on a touch applied to the fourth capture control region (B2). While the second thumbnail image 512b stored in the fourth capture control region (B2) is displayed, each of the third, fifth, and sixth capture control regions (B1, B3, B4) displays the preview image 513 acquired by the camera 121.

The controller 180 controls the touch screen 151 to display an edit screen 521 based on a touch applied to the fourth capture control region (B2). The edit screen 521 may include the second thumbnail image 512b, a tool bar 521a and a region display portion 521b. The tool bar 521a may include a plurality of edit icons for editing the second thumbnail image 512b. The region display portion 521b displays a divided shape of the third, fifth, and sixth capture control regions (B1, B3, B4) and a region of the fourth capture control region (B2) displayed with the second thumbnail image 512b.

According to the present embodiment, a previously stored image may be edited, and a user may know a location at which the selected image is displayed on the divided touch screen on an edit screen.

Figure 6A:
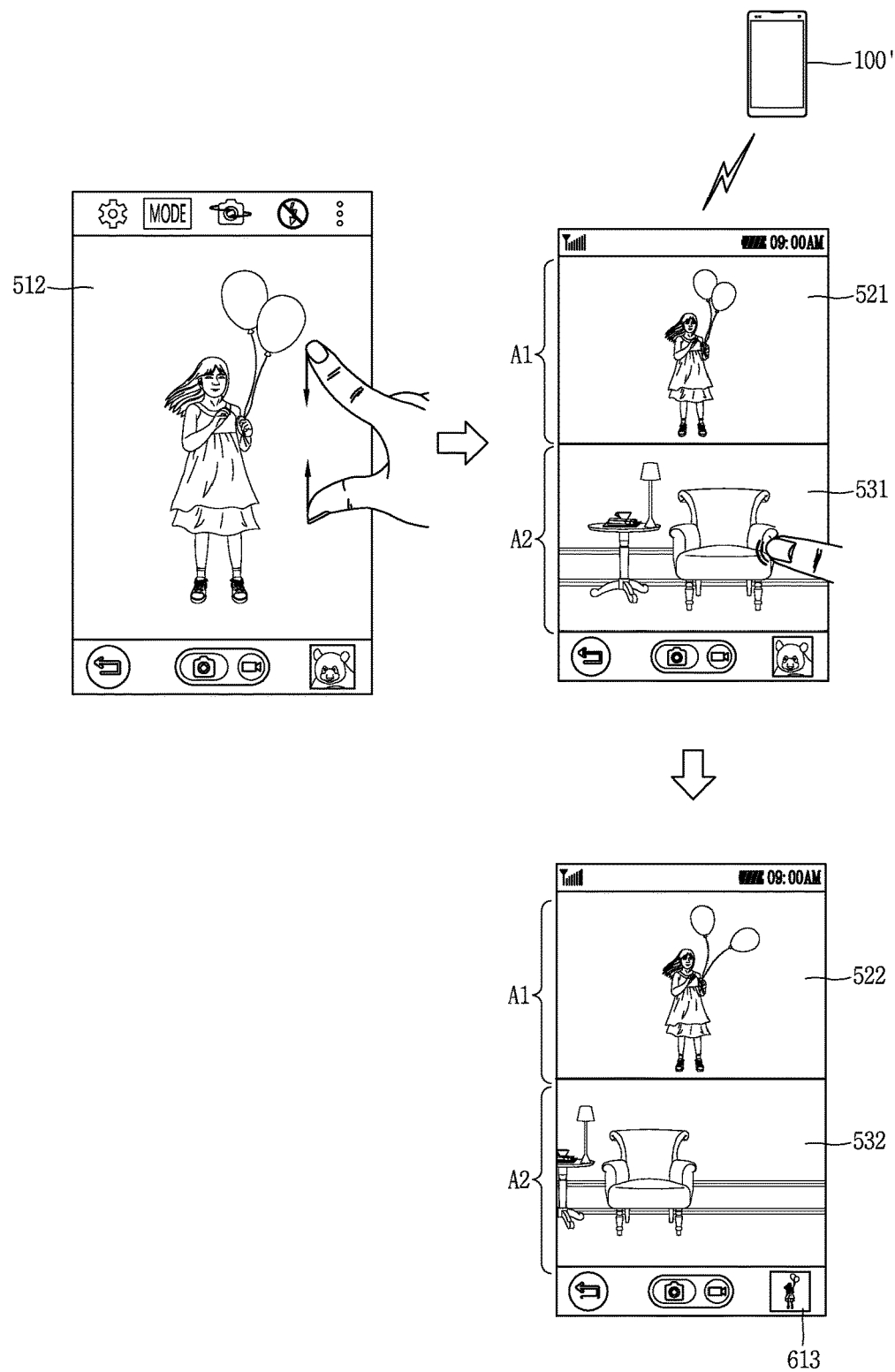
FIGS. 6A through 6C are conceptual views for explaining a method of executing a function associated with an external device at a mobile terminal according to an embodiment of the present disclosure.
Figure 6B:
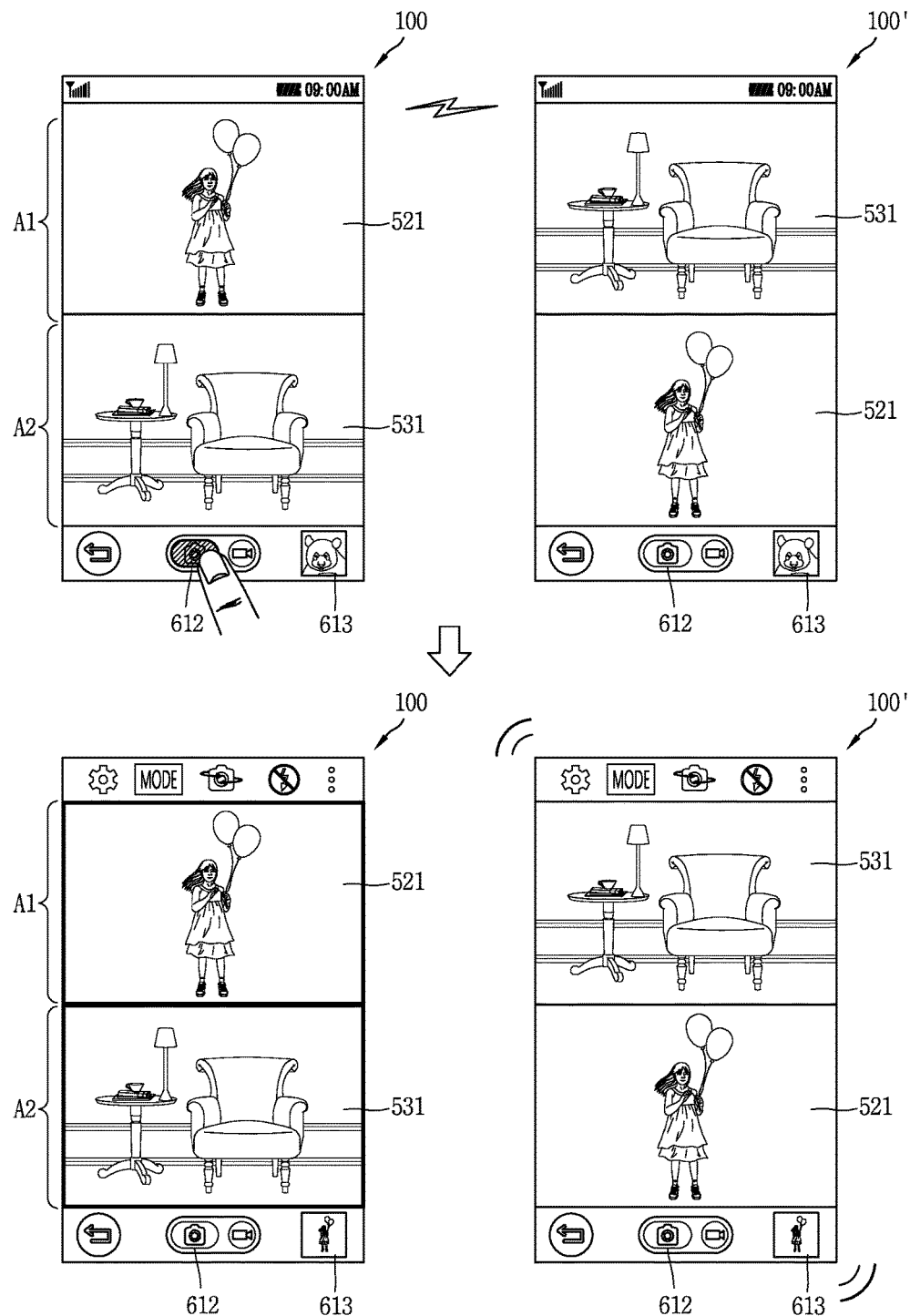
Figure 6C:
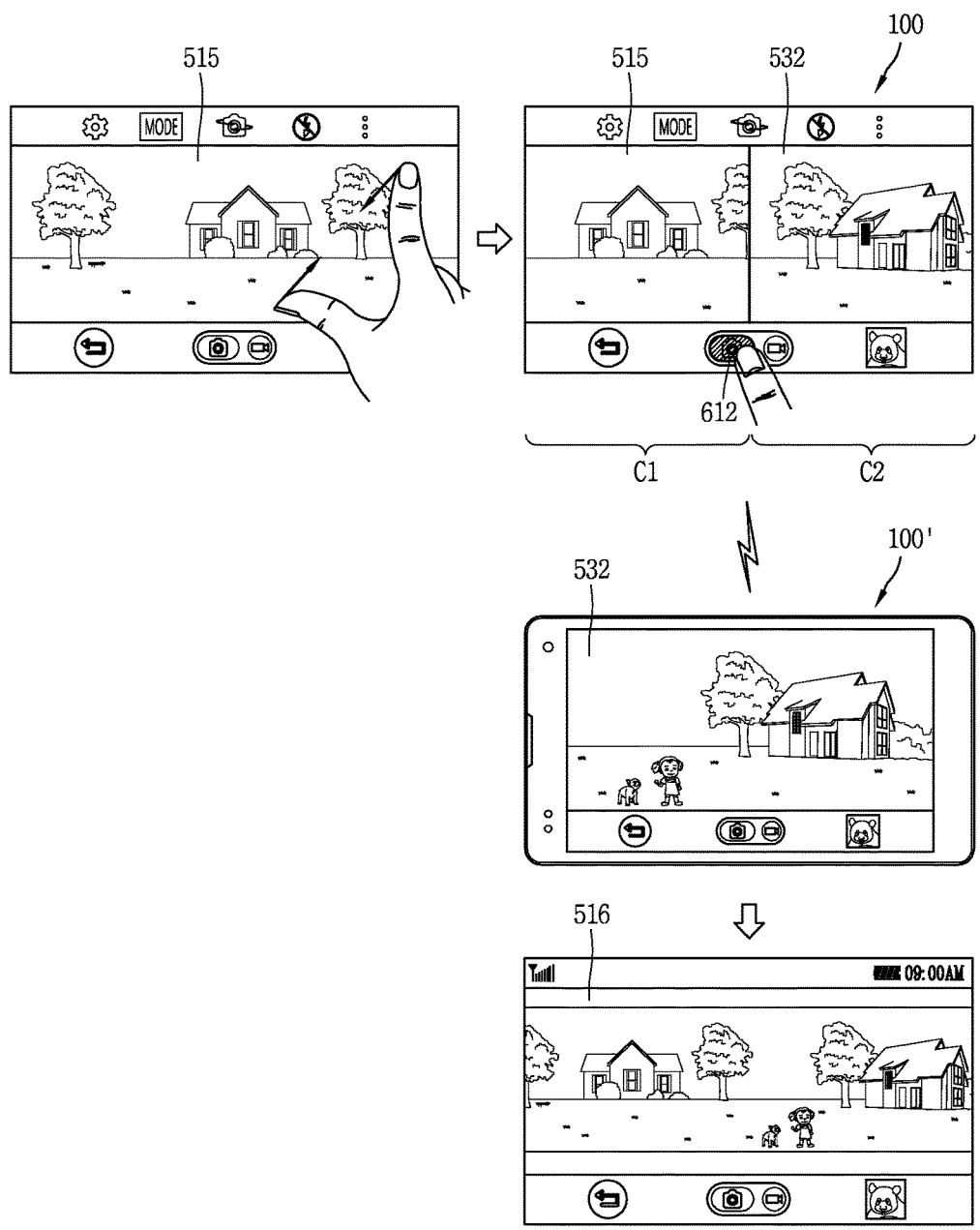

FIGS. 6A through 6C are conceptual views for explaining a method for executing a function associated with an external device.

Referring to FIG. 6A, the controller 180 controls the wireless communication unit 110 to perform wireless communication with an external device 100' based on a specific type of touch applied in a state that the second preview image 512 is displayed. The external device 100' may correspond to a mobile terminal having a camera, but may not be necessarily limited to this. The external device 100' may be specified by the user's setting or set by the user's selection among a plurality of external devices 100' searched around the mobile terminal 100.

When connected to the external device 100' in a wireless manner, the controller 180 partitions the touch screen 151 into first and second capture control regions (A1, A2). The touch screen 151 displays the edit screen 521 in the first capture control region (A1). The touch screen 151 may display one region of the edit screen 521 or change the size of the edit screen 521 to display it in the first capture control region (A1).

The controller 180 controls the touch screen 151 to receive a third preview image 531 acquired by the camera of the external device 100', and to display the third preview image 531 in the second capture control region (A2).

The controller 180 forms a capture control command based on a touch applied to the second capture control region (A2). The wireless communication unit 110 transmits the capture control command to the external device 100', and receives an image captured by the camera of the external device 100'. The controller 180 causes storing of the image in the memory 170, and controls the touch screen 151 to display the stored image on the gallery icon 613.

While the image is stored, the camera 121 and the camera of the external device 100' may continuously receive their respective external environments. Each of the first and second capture control regions (A1, A2) displays a respective real-time received new preview image 522, 532.

Though not shown in the drawing, the controller 180 may cause storing of the second preview image 521 in response to a touch applied to the first capture control region (A1). Furthermore, the controller 180 may control the third preview image 531 to be stored in the memory of the external device 100' based on a touch applied to the second capture control region (A2).

According to the present embodiment, the user may receive an image acquired by the camera of the external device 100' at the same time, and store an image captured by the camera of the external device 100' in the mobile terminal 100.

Though a mobile terminal 100 is connected to one external device 100' in a wireless manner in FIG. 6A, the present disclosure may not be necessarily limited to this. For example, when the specific type of touch (for example, pinch-in touch input) is applied to the first and second capture control regions (A1, A2), the controller 180 may partition the touch screen 151 into three or more capture control regions and control the wireless communication unit 110 to perform wireless communication with two or more external devices.

Referring to FIG. 6B, the first capture control region (A1) on the display unit 151 displays the second preview image 521 acquired by the camera 121 of the mobile terminal 100, and the second capture control region (A2) on the display unit 151 displays the third preview image 531 acquired by the camera of the external device 100'.

When the external device 100' is a mobile terminal, the display unit of the external device 100' is divided into a first region (A1) and a second region (A2) to display the third preview image 531 and the second preview image 521, respectively.

The controller 180 forms a control command for controlling the camera 121 and the camera of the external device 100' based on a touch applied to the capture icon 612. The controller 180 causes the display 151 to display the second and third preview images 521, 531 captured by the camera 121 and the camera of the external device 100', respectively, in the first and second capture control regions (A1, A2), respectively.

On the other hand, the display unit of the external device 100' may also continuously display the second and third preview images 521, 531. In other words, the external device 100' may be controlled based on the capture control command.

According to the present embodiment, the user may capture and store images currently displayed on the touch screen 151 at once.

FIG. 6C is a conceptual view for explaining a method of combining images obtained by a camera of a mobile terminal and a camera of an external device.

The touch screen 151 displays a fourth preview image 515, and receives a specific type of touch. For example, the specific type of touch corresponds to a pinch-in touch input, and the fourth preview image 515 corresponds to an image captured at the minimum capture magnification by the camera 121. The controller 180 controls the wireless communication unit 110 to perform wireless communication with the external device 100' based on the specific type of touch applied to the fourth preview image 515.

The controller 180 partitions the touch screen 151 into seventh and eighth capture control regions (C1, C2) in response to the specific type of touch, and causes displaying of the fourth preview image 515 acquired by the camera 121 in the seventh capture control region (C1) and causes displaying of a fifth preview image 532 captured by the camera of the external device 100' in the eighth capture control region (C2). The fourth and the fifth preview image 515, 532 may include different screen information.

The controller 180 causes capturing of the fourth and fifth preview images 515, 532 based on a touch applied to the capture icon 612, and combines the fourth and fifth preview images 515, 532 to form a panorama image 516.

Though not shown in detail in the drawing, the controller 180 may cause capturing of consecutive images according to the movement of the mobile terminal 100 and the external device 100' subsequent to applying a touch to the capture icon 612.

According to the present embodiment, a plurality of images captured by different external devices may be combined to form a panoramic image.

Figure 7A:
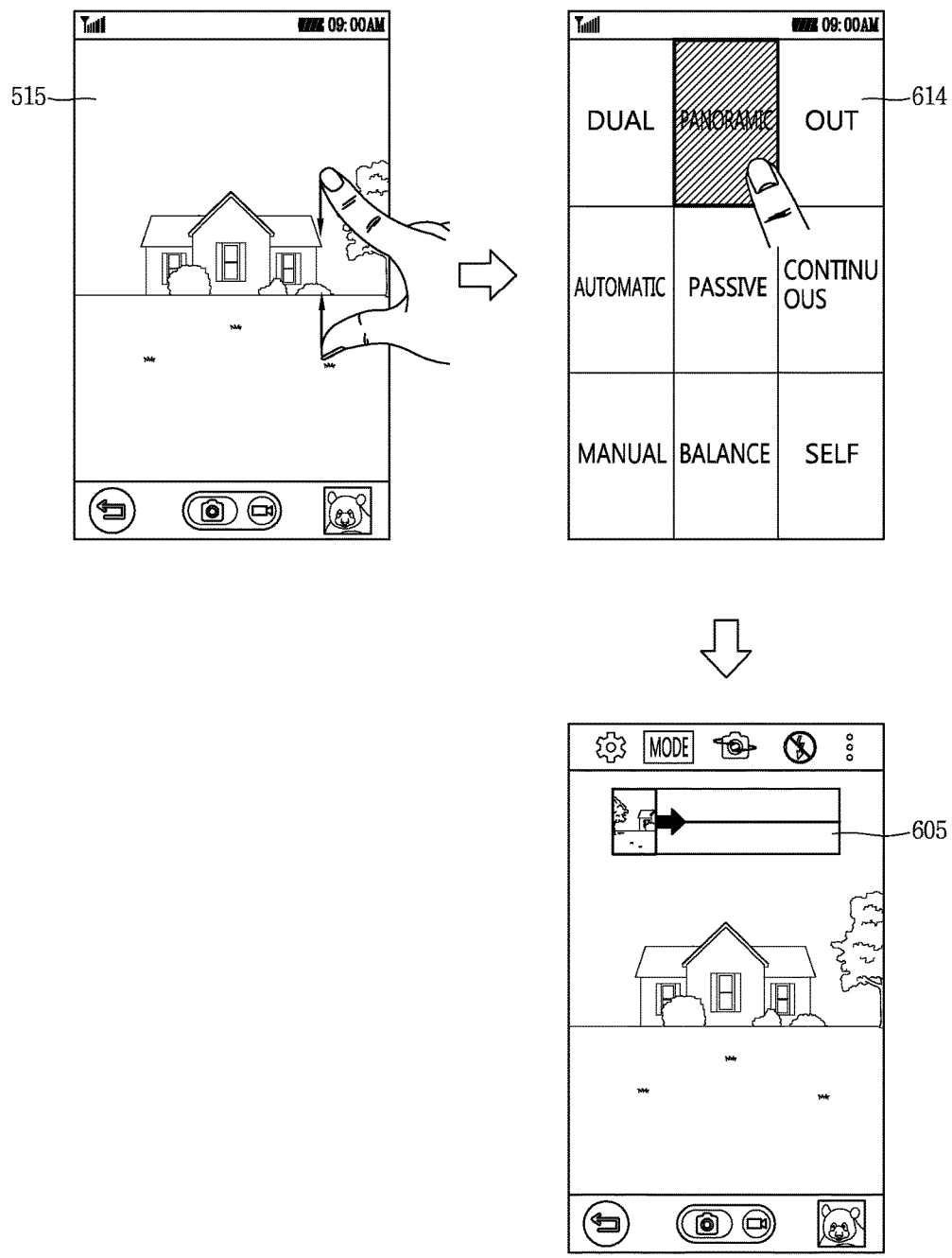
FIGS. 7A and 7B are conceptual views for explaining a method for controlling a change of a capture mode at a mobile terminal according to an embodiment of the present disclosure.
Figure 7B:
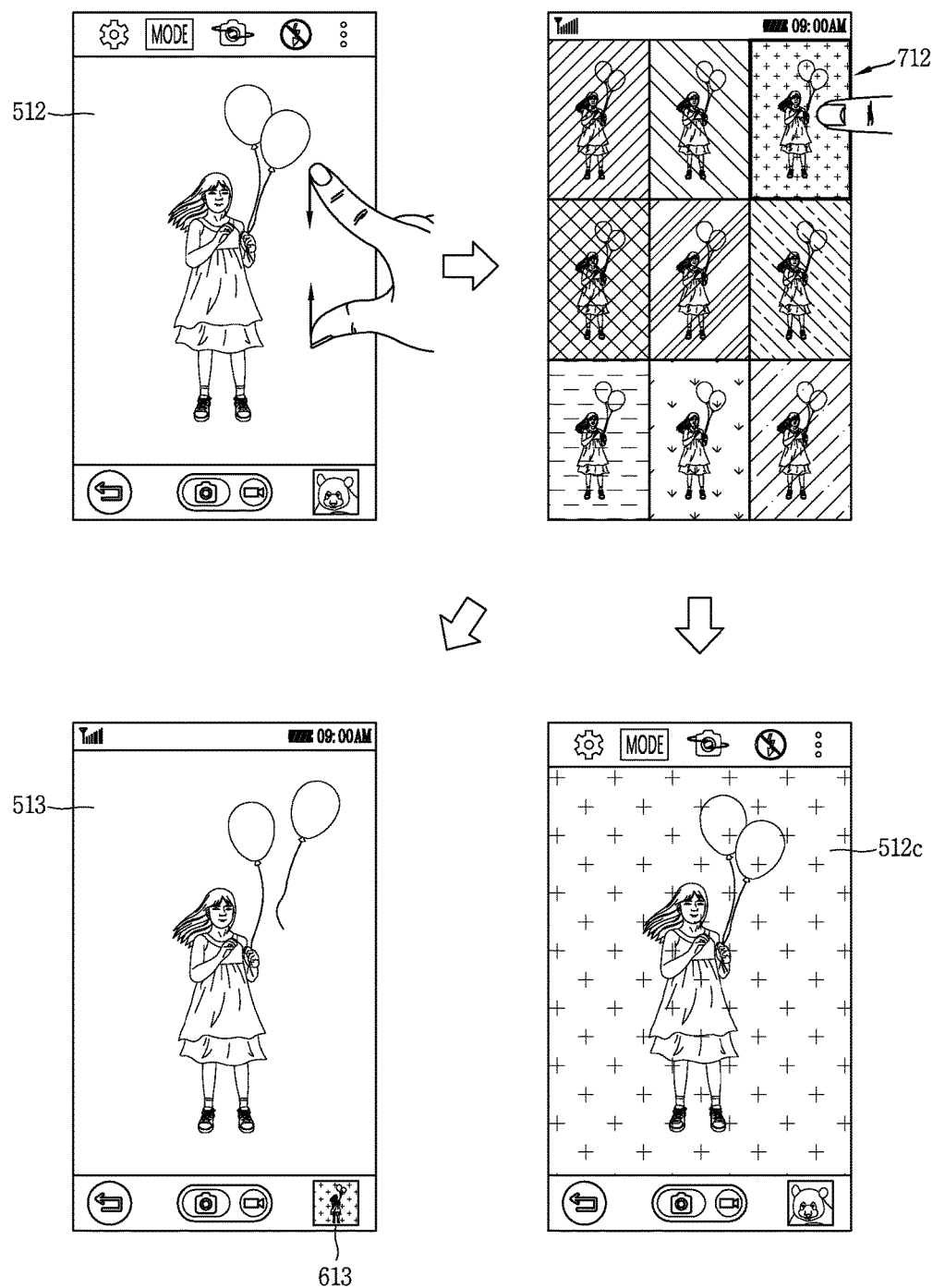

FIGS. 7A and 7B are conceptual views for explaining a method for controlling a change of a capture mode.

Referring to FIG. 7A, a mode select screen 614 for changing a capture mode is displayed based on a specific type of touch (for example, pinch-in touch input) in a state that the fourth preview image 515 is displayed on the touch screen 151. The mode select screen 614 may include a plurality of graphic images corresponding to a plurality of modes. For example, the touch screen 151 may be partitioned into a plurality of regions based on the specific type of touch to display the graphic image. The controller 180 may select a capture mode based on a touch applied to any one of the plurality of regions.

For example, when a panoramic capture mode is selected, the touch screen 151 displays a preview image captured by the camera 121 and an icon 605 associated with the panoramic capture mode. When the capture mode is selected, the controller 180 controls the memory 170 to store the captured preview image. In other words, the camera 121 is controlled to capture an image in the selected capture mode based on a touch applied to one of the partitioned plurality of regions.

Though not shown in the drawing, when a specific touch is additionally applied to the mode select screen 614, the controller 180 partitions the touch screen 151 into a larger number of regions corresponding to additional capture modes.

Furthermore, the touch screen 151 may display a modification image to which the preview image is applied on a capture control region corresponding to each capture mode.

According to the present embodiment, a capture operation may be carried out in a desired capture mode in a more speedy manner without requiring any additional processes for selecting a capture mode.

Referring to FIG. 7B, the controller 180 partitions the touch screen 151 into a plurality of regions 712 based on a specific type of touch (for example, pinch-in touch input) applied in a state that the touch screen 151 displays the second preview image 512. The second preview image 512 corresponds to an image acquired at the minimum capture magnification of the camera 121.

The touch screen 151 displays the second preview image 512 in each of the plurality of regions 712. A different visual effect is applied to the second preview image 512 displayed in each of the plurality of different regions 712.

The controller 180 controls the touch screen 151 to apply different visual effects to images acquired by the camera 121 such that images are displayed with the applied different visual effects. The touch screen 151 may apply a plurality of visual effects to images recognized by the camera 121 such that each of the plurality of regions 712 includes the same preview image 512 with a different visual effect applied thereto.

The controller 180 controls the memory 170 to store a second preview image 512c to which the visual effect is applied based on a touch applied to one of the plurality of regions 712. The touch screen 151 displays the second preview image 512c to which the selected visual effect is applied as an enlarged image based on the touch.

Alternatively, the controller 180 controls the memory 170 to store the second preview image 512c to which the visual effect is applied based on a touch applied to one of the plurality of regions. Furthermore, the controller 180 controls the touch screen 151 to display the gallery icon 613 indicating the second preview image 512c to which the visual effect is applied. In this case, the touch screen 151 redisplays a preview image 513 acquired by the camera 121.

Furthermore, though not shown in the drawing, when a touch is applied to the plurality of regions, the memory 170 stores a preview image to which the selected visual effect is applied and the touch screen 151 displays the stored preview image. In this case, the touch screen 151 may apply the remaining visual effect to a preview image in which the remaining region is recognized by the camera 121 to display it.

Figure 8A:
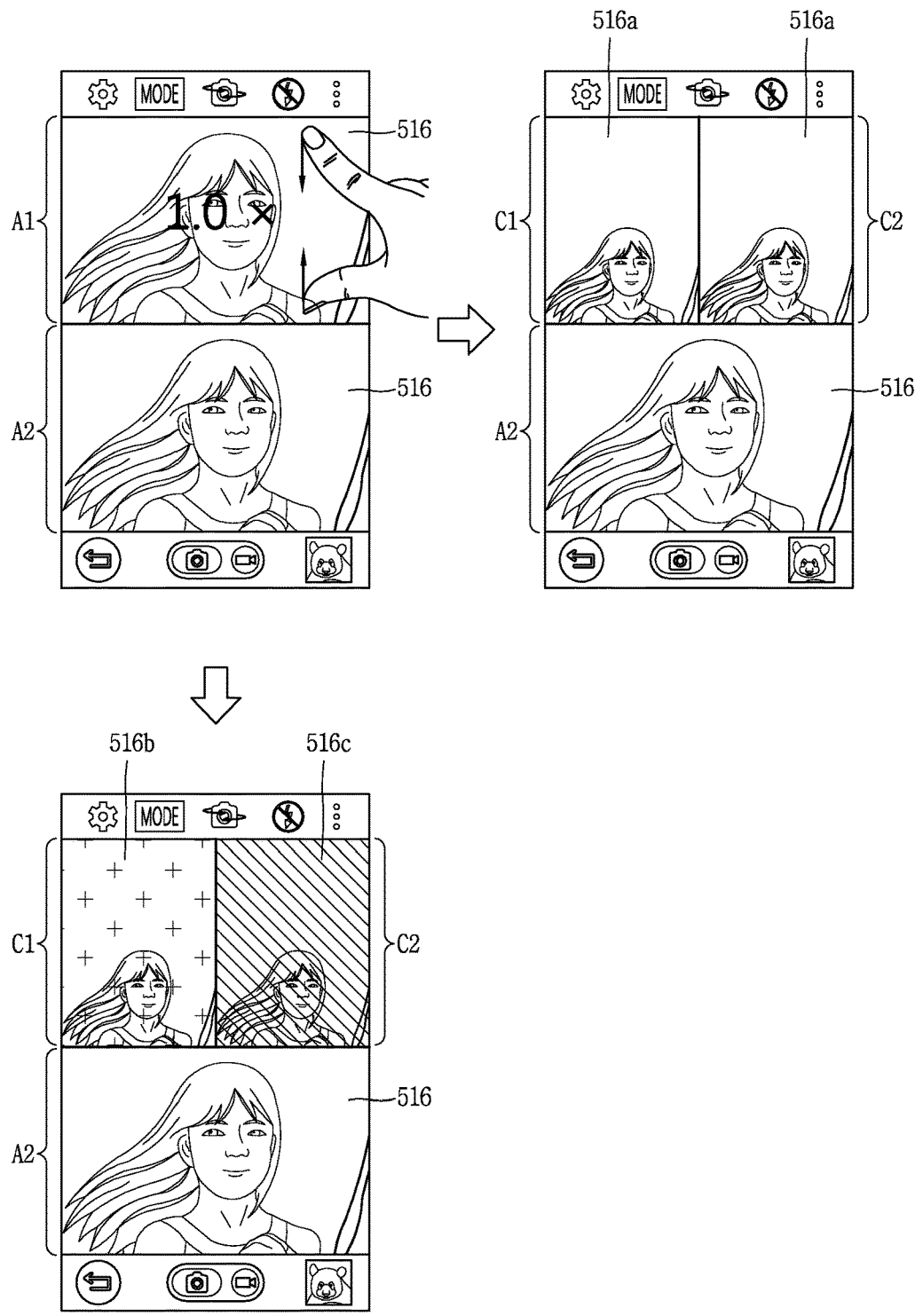
FIGS. 8A through 8C are conceptual views for explaining a method for controlling partitioning of a touch screen at a mobile terminal according to an embodiment of the present disclosure.
Figure 8B:
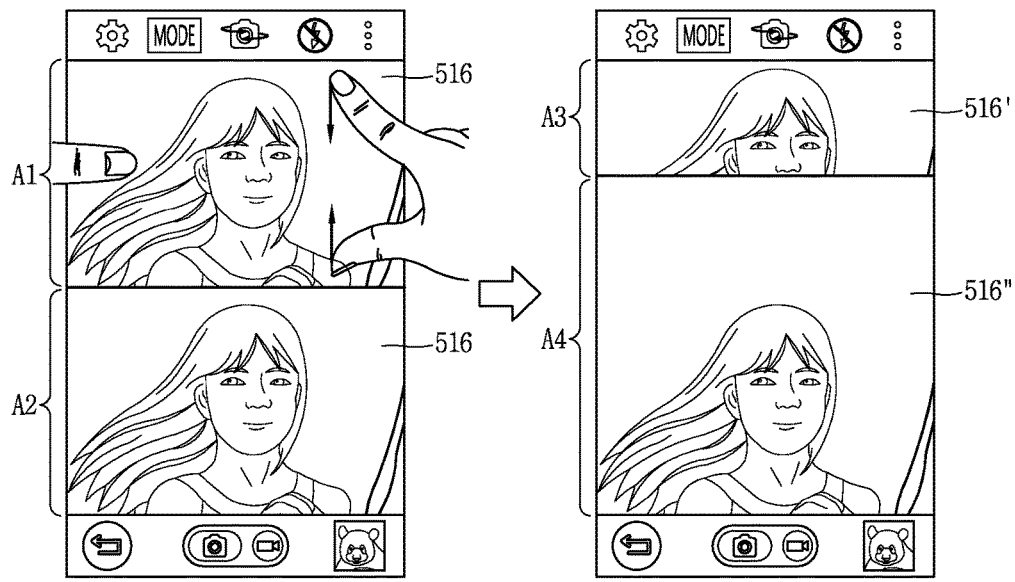
Figure 8C:
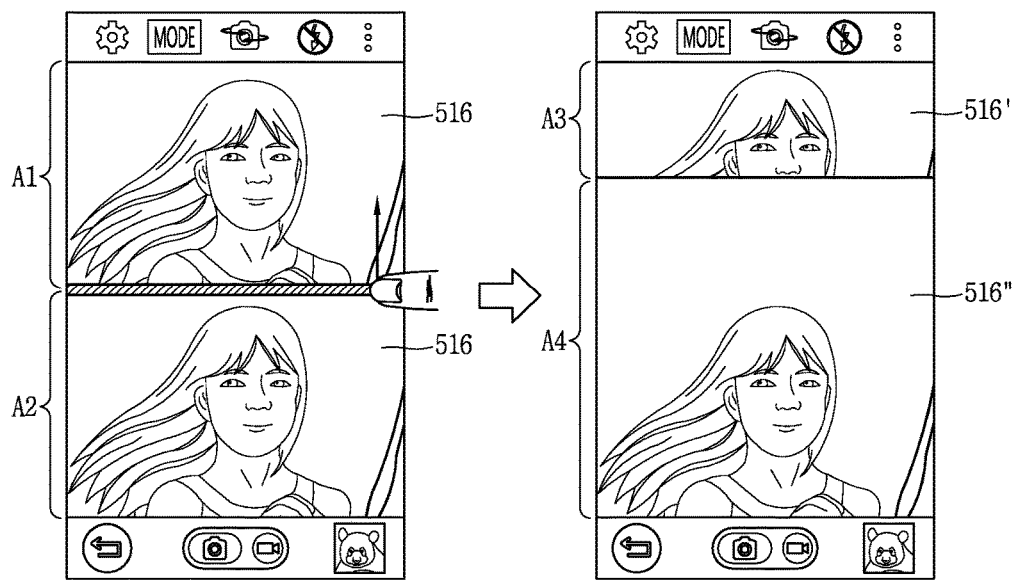

FIGS. 8A through 8C are conceptual views for explaining a method for controlling partitioning of a touch screen.

Referring to FIG. 8A, the touch screen 151 displays a sixth preview image 516 on each of the first and second capture control regions (A1, A2). The sixth preview image 516 corresponds to an image captured at the minimum capture magnification of the camera 121. When a specific type of touch (for example, pinch-in touch input) is applied to the first capture control region (A1), the controller 180 divides the first capture control region (A1) into a plurality of regions (C1, C2). The thumbnail image 516a of the sixth preview image 516 is displayed in each of the divided plurality of regions (C1, C2). The controller 180 may cause capturing of a preview image 516 displayed based on a touch applied to the plurality of regions (C1, C2).

Alternatively, the controller 180 partitions the first capture control region (A1) into a plurality of regions (C1, C2) based on the specific type of touch applied to the first capture control region (A1). One (C1) of the plurality of regions displays a first modification image 516b, and another one (C2) of the plurality of regions displays a second modification image 516c. Different visual effects are applied to the sixth preview image 516 such that the first modification image 516b and the second modification image 516c are displayed with different visual effects for the same sixth preview image 516.

Accordingly, the controller 180 may recognize an additional touch applied to each region of the touch screen 151 that has been partitioned into a plurality of regions to perform a new function.

Referring to FIG. 8B, when the specific type of touch (for example, pinch-in touch input) is applied to the first capture control region (A1) in a state that the touch screen 151 is partitioned into the first and second capture control regions (A1, A2), the controller 180 controls the touch screen 151 to reduce the first capture control region (A1) and enlarge the second capture control region (A2) to result in displaying of the reduced sized first capture control region (A3) displaying a portion (516') of the preview image 516 and the enlarged sized second capture control region (A4) displaying the preview image 516 including an additional portion (516").

Referring to FIG. 8C, the controller 180 may change the size of the first and second capture control regions (A1, A2) based on a touch applied to a boundary between the first and second capture control regions (A1, A2) instead of the pinch-in touch input described referring to FIG. 8B.

Figure 9A:
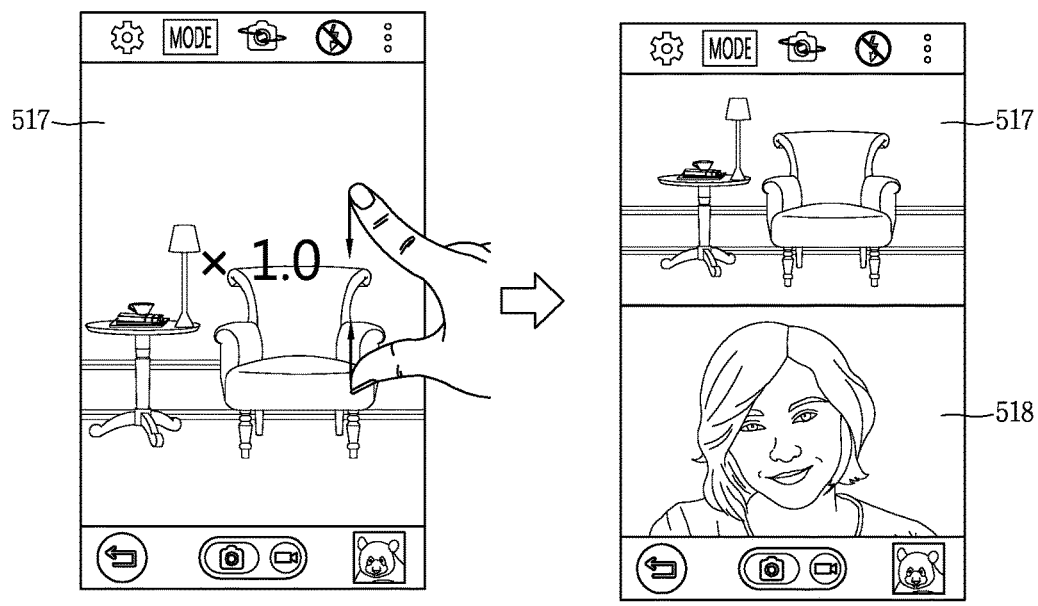
FIGS. 9A through 9C are conceptual views for explaining a method for controlling a plurality of cameras at a mobile terminal according to an embodiment of the present disclosure.
Figure 9B:
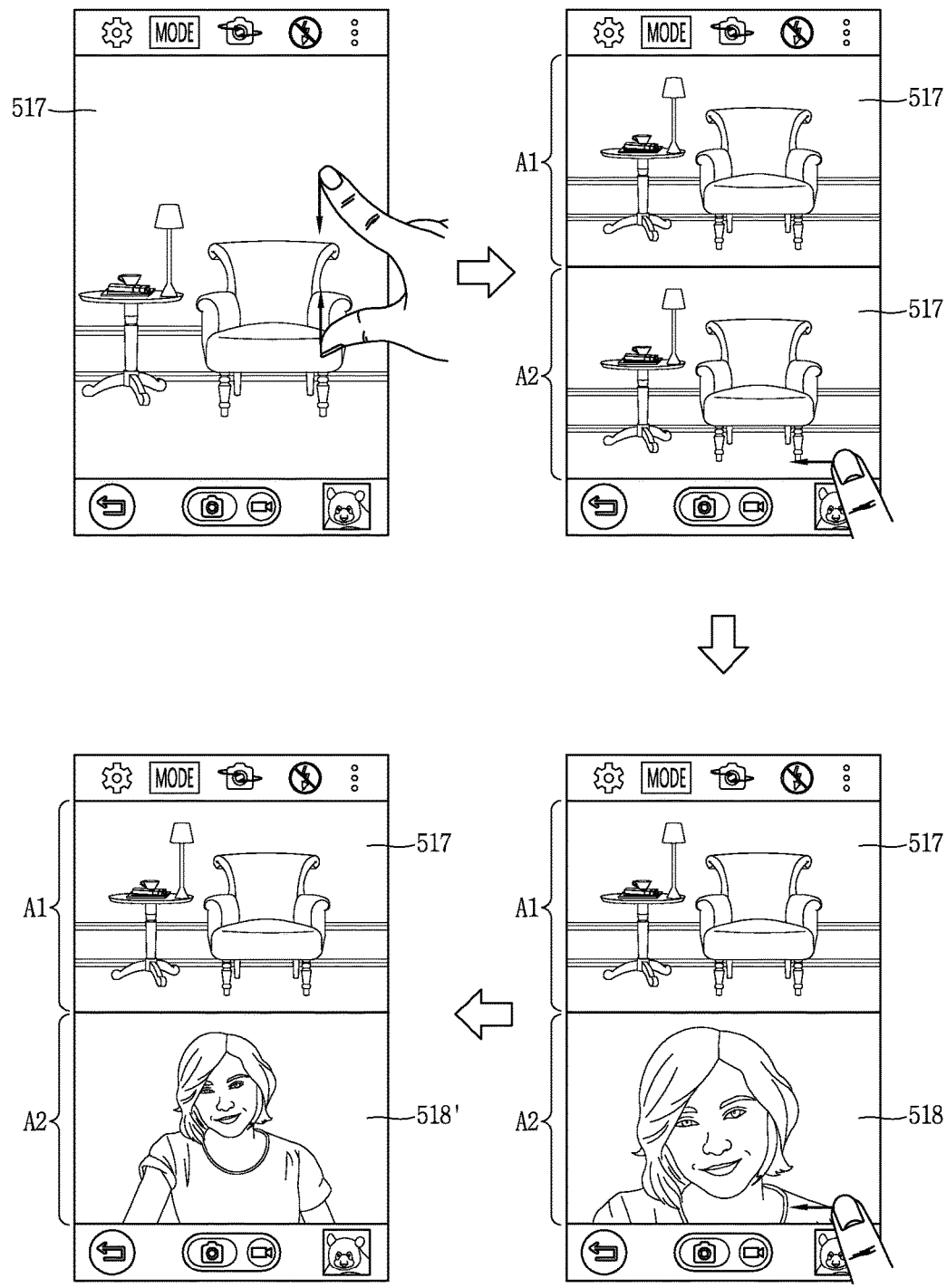
Figure 9C:
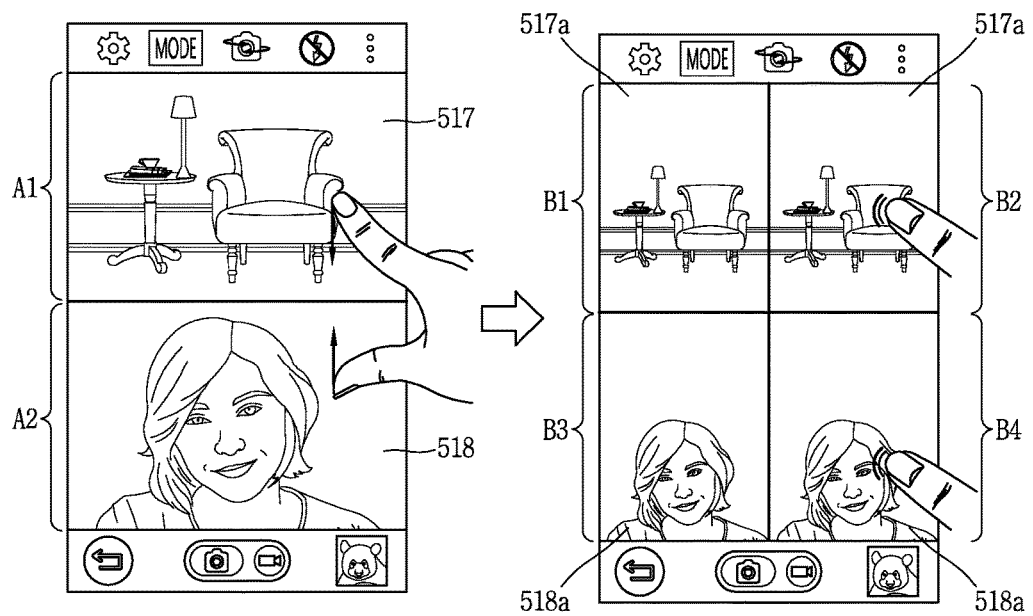

FIGS. 9A through 9C are conceptual views for explaining a method for controlling a plurality of cameras of the mobile terminal.

Referring to FIG. 9A, when the specific type of touch (for example, pinch-in touch input) is applied to the touch screen 151 in a state that a seventh preview image 517 is displayed, the controller 180 activates a front camera 121a. The seventh preview image 517 corresponds to an image acquired at the minimum capture magnification of the rear camera 121b.

The touch screen 151 is partitioned into the first and second capture control regions (A1, A2) such that the seventh preview image 517 is displayed on the first capture control region (A1) and an eighth preview image 518 acquired from the front camera 121a is displayed on the second capture control region (A2).

In other words, the controller 180 may activate an additional camera based on the specific type of touch, and may receive images acquired by different cameras at the same time.

Referring to FIG. 9B, when the specific type of touch is applied to the touch screen 151 in a state that the seventh preview image 517 is displayed, the controller 180 partitions the touch screen 151 into the first and second capture control regions (A1, A2).

The controller 180 activates the front camera 121a based on a touch applied to the second capture control region (A2), and controls the display unit 151 to display the eighth preview image 518 acquired by the front camera 121a in the second capture control region (A2). Here, the touch may correspond to a dragging type of touch input applied in one direction.

Though not shown in the drawing, when a dragging type of touch input is applied to the second capture control region (A2) in a different direction, the controller 180 controls the touch screen 151 to display the seventh preview image 517 again.

The controller 180 switches a capture mode of the camera 121 based on the touch applied to the second capture control region (A2). Here, the touch corresponds to a dragging type of touch applied in the one direction.

For example, the controller 180 may control the front camera 121a to change a viewing angle of the front camera 121a based on the dragging type of touch. In other words, the controller 180 may form a control command for activating a wide angle capture mode. Then, the second capture control region (A2) displays a preview image 518' captured in the wide angle capture mode.

According to the present embodiment, the controller 180 may recognize a touch applied to the divided capture control region to control the activation of a camera or change the capture mode of the camera.

Referring to FIG. 9C, the touch screen 151 is partitioned into the first and second capture control regions (A1, A2) to display the seventh preview image 517 and the eighth preview image 518, respectively, in a respectively corresponding capture control region (A1/A2).

The controller 180 partitions the touch screen 151 into the third through sixth capture control regions (B1, B2, B3, B4) based on a specific type of touch (for example, pinch-in touch input) applied to the touch screen 151. One of two touch points in the pinch-in touch mode corresponds to the first capture control region (A1) and the other one of the two touch points corresponds to the second capture control region (A2).

The touch screen 151 displays a thumbnail image 517a of the seventh preview image 517 on each of the third and fourth control regions (B1, B2). Furthermore, the touch screen 151 displays a thumbnail image 518a of the eighth preview image 518 on each of the fifth and sixth capture control regions (B3, B4).

The controller 180 causes capturing of images displayed in the fourth and sixth capture control regions (B2, B4) or form a video file based on a touch applied to the fourth and sixth capture control regions (B2, B4). The controller 180 controls the touch screen 151 to display the capture bar 602 indicating a capture time of the image while the video file is generated.

In other words, according to the present embodiment, it may be possible to form a video file or store images while checking preview images acquired by a plurality of cameras.

Figure 10A:
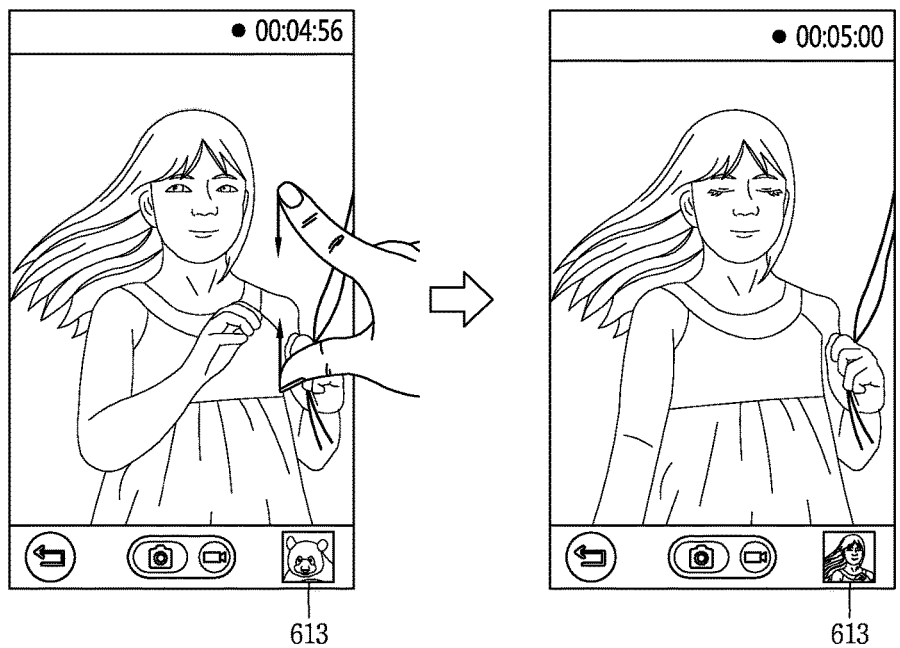
FIGS. 10A through 10C are conceptual views for explaining a method of capturing an image at a mobile terminal according to an embodiment of the present disclosure.
Figure 10B:
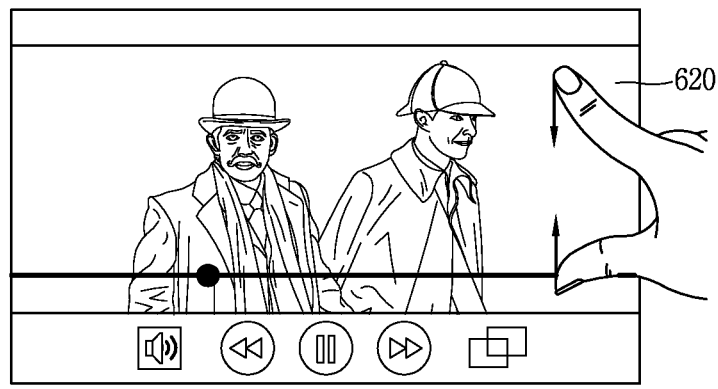
Figure 10B:
Figure 10B:
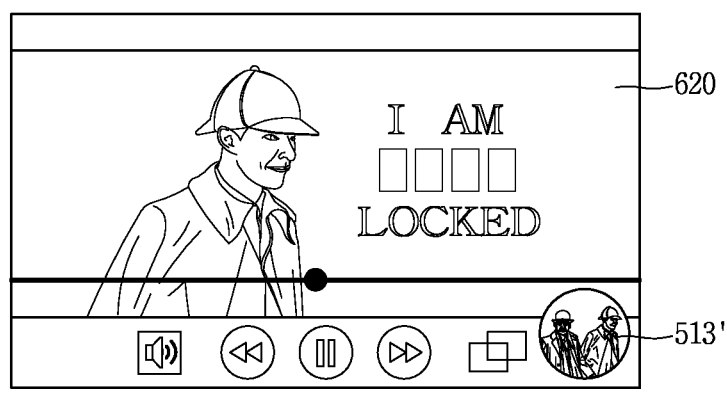
Figure 10C:
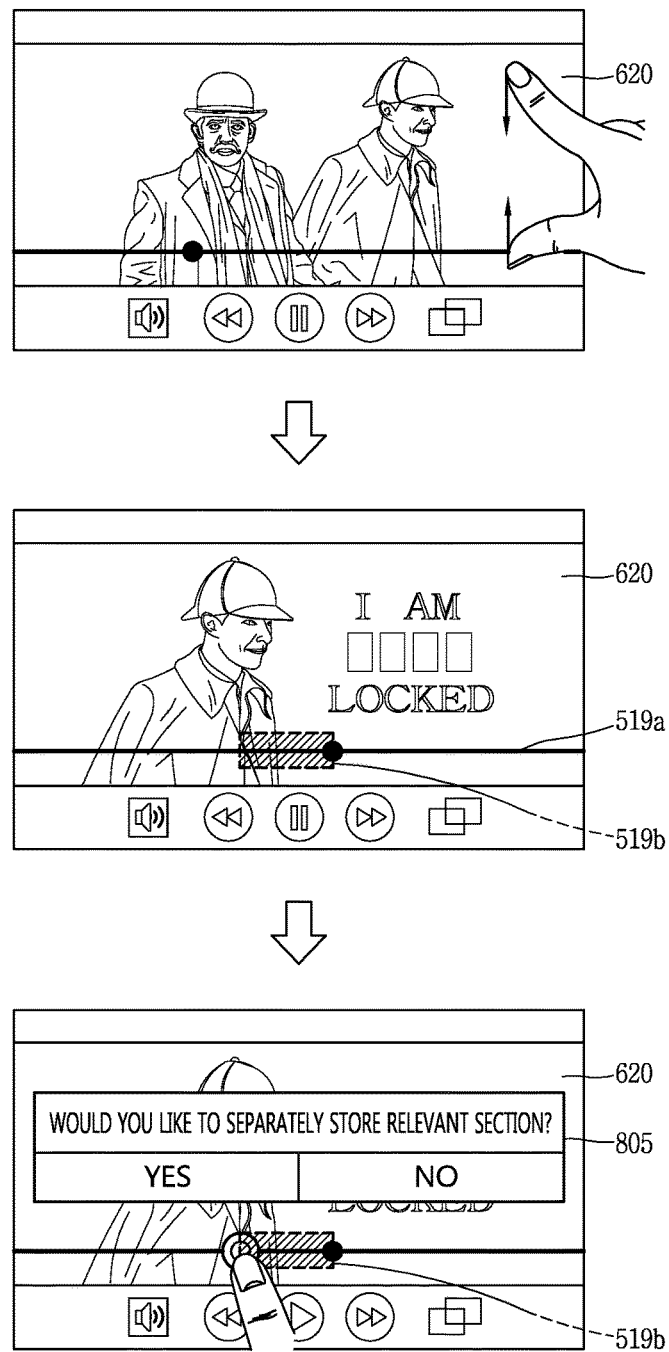

FIGS. 10A through 10C are conceptual views for explaining a method of capturing an image.

Referring to FIG. 10A, when the specific type of touch (for example, pinch-in touch input) is applied to the touch screen 151 during video capture, the controller 180 controls the memory 170 to store a preview image at a time point at which the specific type of touch is applied.

In other words, the controller 180 captures an image displayed on the touch screen 151 based on the specific type of touch. The touch screen 151 displays the captured image on the gallery icon 613.

Referring to FIG. 10B, the touch screen 151 displays the play screen 620 of a video file. When the specific type of touch (for example, pinch-in touch input) is applied to the play screen, the controller 180 controls the memory 170 to store screen information at a time point at which a specific type of touch is applied.

The touch screen 151 displays an icon 513' corresponding to the captured screen. The controller 180 may cause displaying of an image captured based on a touch applied to the icon 513'.

Referring to FIG. 10C, the touch screen 151 displays the play screen 620 of a video file, and displays a play bar 519a indicating a play time of the video file. The controller 180 cause displaying of a store section portion 519b on the play bar 519a based on a touch applied to the play screen 620.

When a touch is applied to the store section portion 519b, the controller 180 controls the touch screen 151 to display a check window 805 for checking whether or not to separately store the section.

According to the present embodiment, a pinch-in touch input may be applied while capturing a video or playing a video file to separately store an image at the relevant time point. Accordingly, the user may immediately store an image in a separate manner without stopping video play to capture the image.

Figure 11A:
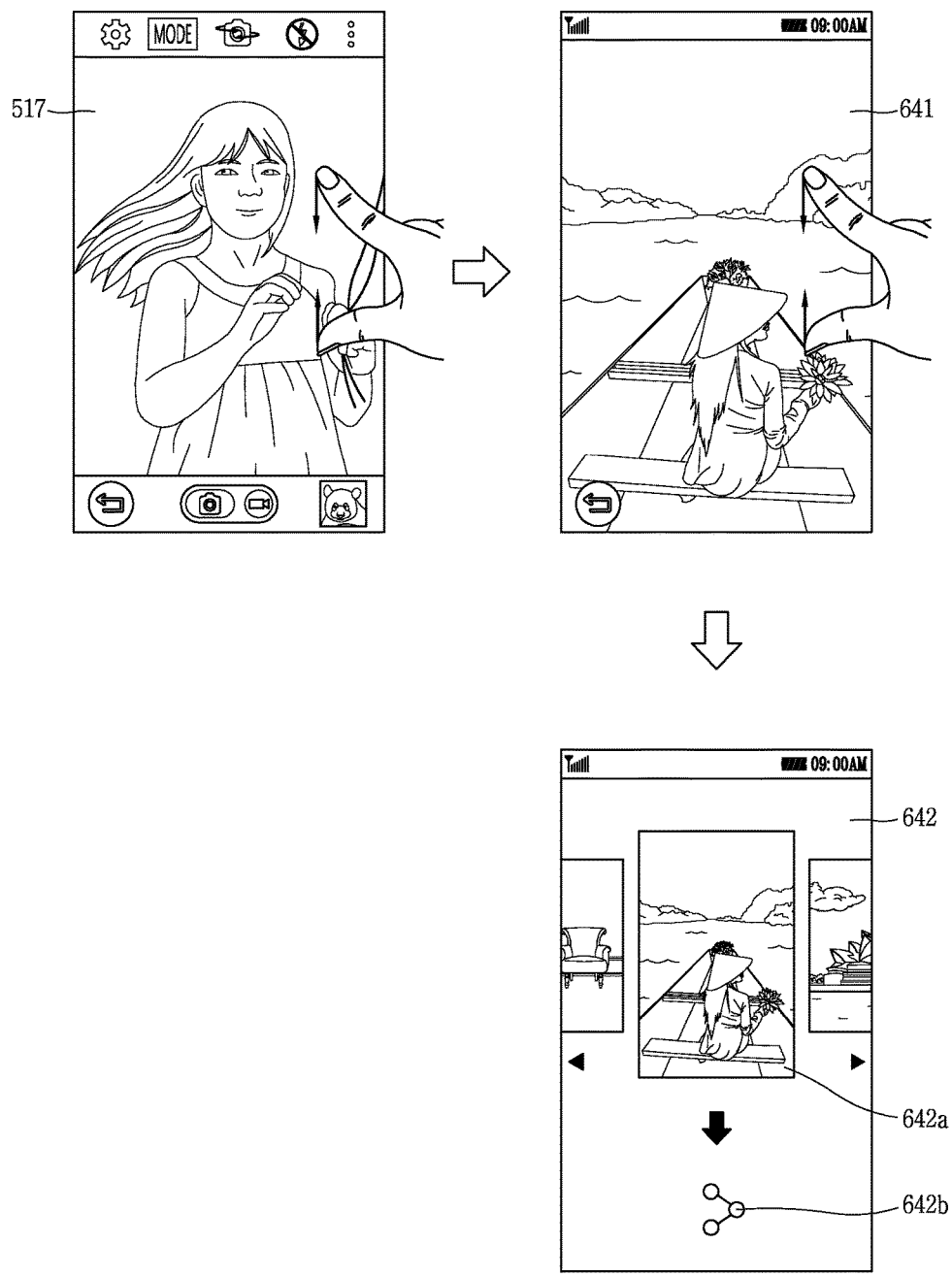
FIGS. 11A through 11C are conceptual views for explaining a method of displaying a previously stored image at a mobile terminal according to an embodiment of the present disclosure.
Figure 11B:
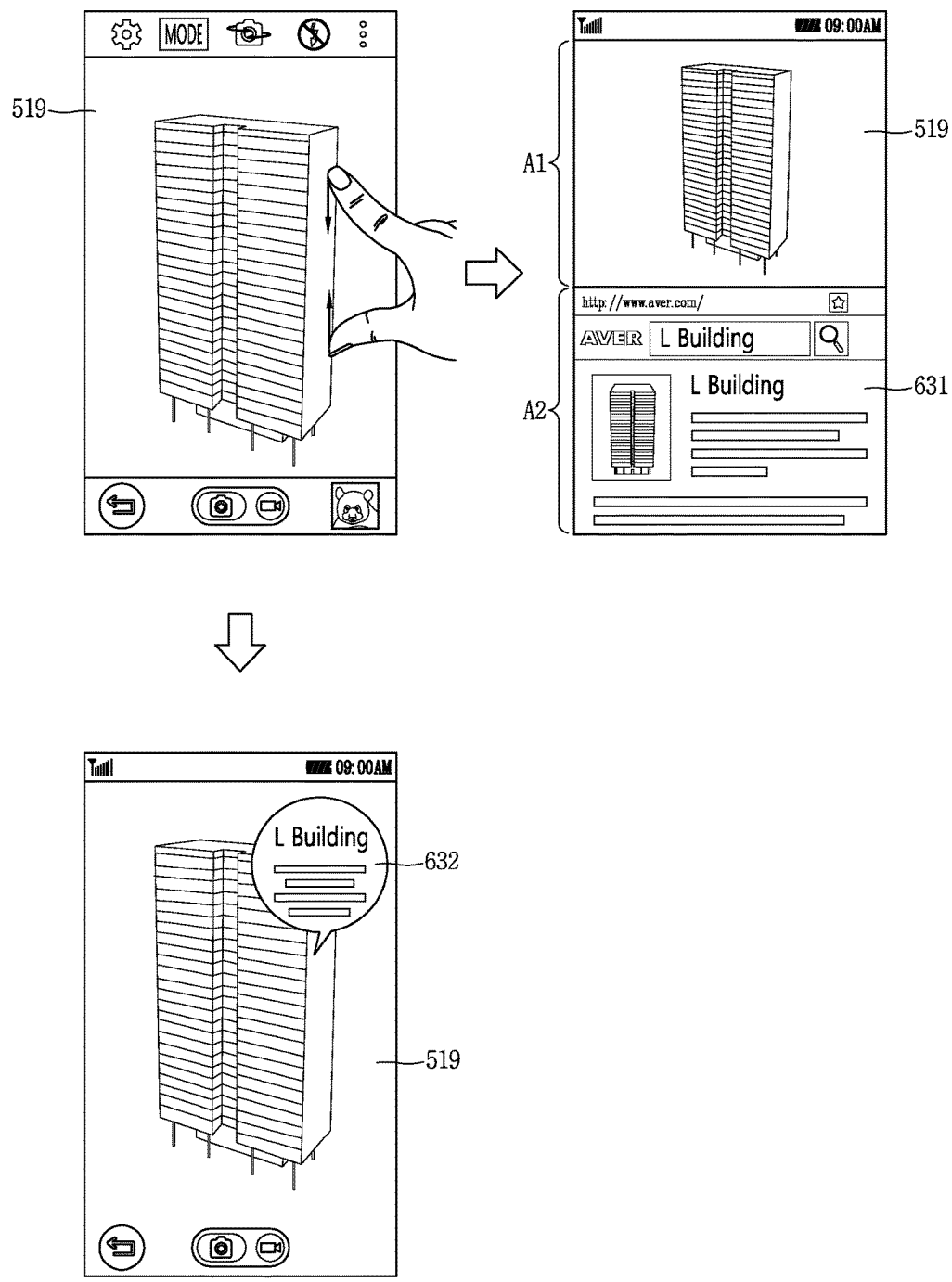
Figure 11C:
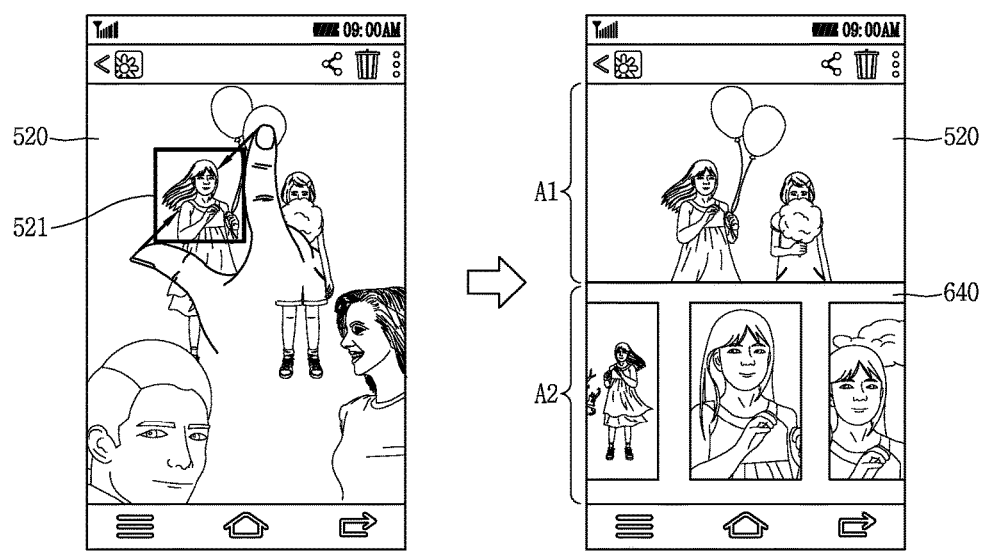

FIGS. 11A through 11C are conceptual views for explaining a method of displaying a previously stored image.

Referring to FIG. 11A, when the specific type of touch is applied to the touch screen 151 in a state that the seventh preview image 517 is displayed, the controller 180 controls the touch screen 151 to display a storage image 641 previously stored in the memory 170. The storage image 641 may correspond to an image captured by the camera 121 or an image stored at a server.

The controller 180 causes displaying of screen information 642 including a plurality of storage images based on the specific touch input applied to the storage image 641. The screen information 642 may include a plurality of sequentially arranged storage images 642a and a control icon 642b for controlling (for example, sharing, deleting, copying, editing, etc.) the storage images 642a.

According to the present embodiment, when a camera 121 is activated to display a preview image, a specific touch input may be applied to provide storage image files, and the type of provided image files may be set by the user.

Referring to FIG. 11B, the touch screen 151 displays a ninth preview image 519 acquired by the camera 121.

The controller 180 analyzes an object included in the ninth preview image 519 based on a specific type of touch (for example, pinch-in touch input) applied to the ninth preview image 519. The controller 180 collects information associated with the object included in the ninth preview image 519. For example, the controller 180 may search information associated with the object to receive the information from a specific server or search information associated with the object from the memory 170.

The touch screen 151 is partitioned into the first and second capture control regions (A1, A2) based on the specific touch, and the first capture control region (A1) may display the ninth preview image 519 and the second capture control region (A2) may display screen information 631 including information associated with the object.

Alternatively, the touch screen 151 may display a graphic image 632 associated with the information on the ninth preview image 519. In this case, the controller 180 may store the graphic image 632 and the ninth preview image 519 at the same time based on a capture command applied by the user.

According to the present embodiment, the information of an object included in a preview image may be checked based on a specific touch input prior to storing the preview image. Furthermore, the preview image may be stored along with the information.

Referring to FIG. 11C, the controller 180 may analyze a figure include in a tenth preview image 520 based on the specific type of touch (for example, pinch-in touch input) applied to the tenth preview image 520. The controller 180 may select an object 521 between two touch positions of a pinch-in touch input applied to the tenth preview image 520.

The controller 180 partitions the touch screen 151 into the first and second capture control regions (A1, A2) based on the specific type of touch. The first capture control region (A1) displays the tenth preview image 520, and the second capture control region (A2) displays screen information 640 including at least one image associated with the selected object.

The controller 180 may extract at least one image including the selected object from the memory 170. Otherwise, the controller 180 may receive at least one image associated with the object from a specific server. For example, the controller 180 may recognize a figure included in the tenth preview image 520, and extract an image including the same figure. However, the selected object may not be necessarily limited to a figure.

According to the present embodiment, the user may receive images associated with information included in a preview image prior to storing the preview image.

Figure 12A:
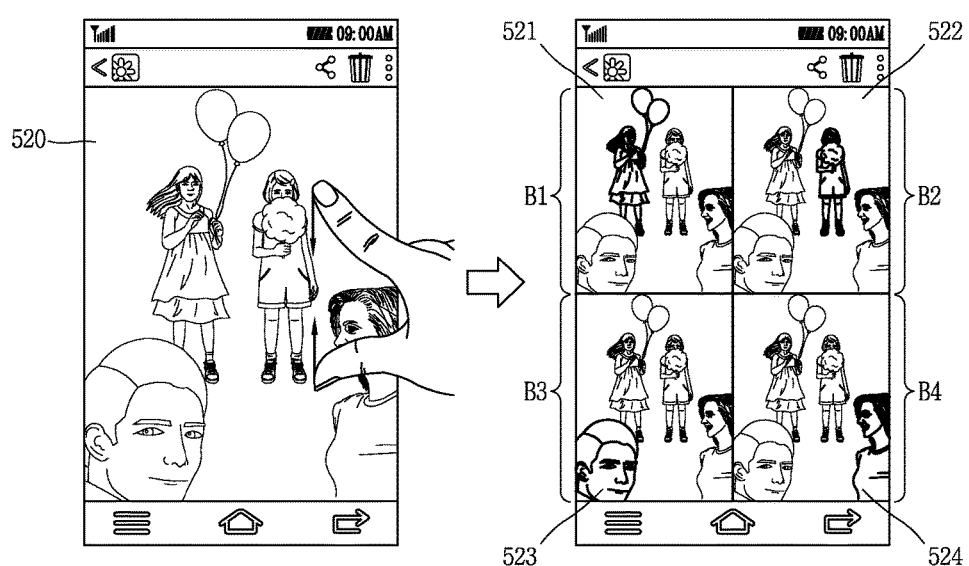
FIGS. 12A through 12C are conceptual views for explaining a function associated with a camera and carried out by a specific control command at a mobile terminal according to an embodiment of the present disclosure.
Figure 12B:
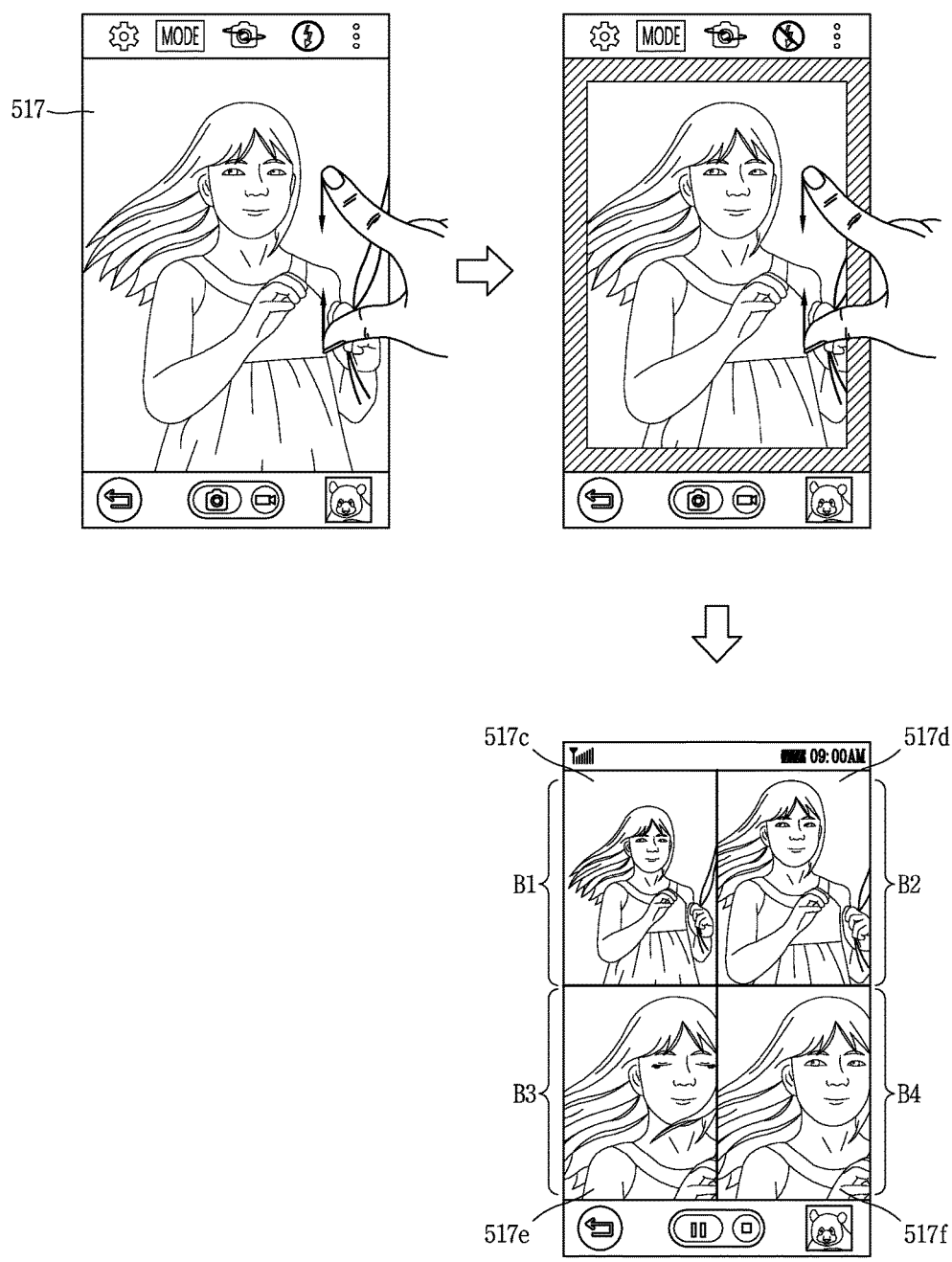
Figure 12C:
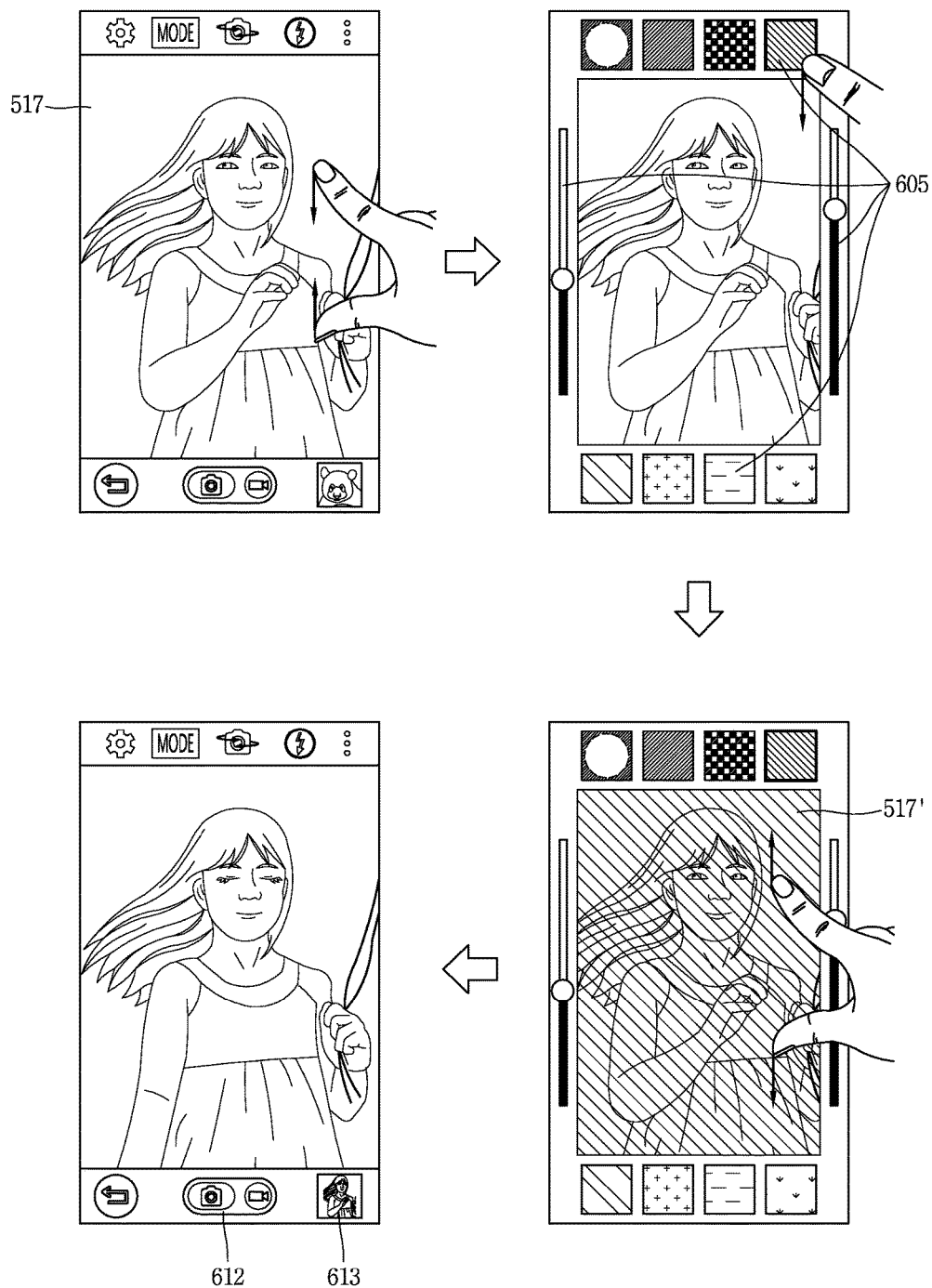

FIGS. 12A through 12C are conceptual views for explaining a function associated with a camera and carried out by a specific control command.

Referring to FIG. 12A, the touch screen 151 displays the tenth preview image 520 acquired at the minimum capture magnification of the camera 121. The controller 180 controls the touch screen 151 to display a plurality of preview images 521, 522, 523, 524 focused on different regions based on a specific type of touch (for example, pinch-in touch input) applied to the tenth preview image 520.

When the specific type of touch is applied, the controller 180 obtains a number of objects included in the tenth preview image 520, and partitions the touch screen 151 to correspond to the number. Referring to FIG. 12A, the controller 180 obtains four figures included in the tenth preview image 520, and partitions the touch screen 151 into the third, fourth, fifth, and sixth capture control regions (B1, B2, B3, B4).

The controller 180 causes displaying of first through fourth focus images as the plurality of preview images 521, 522, 523, 524, each focusing on a respectively corresponding one of the four figures (objects) in the third, fourth, fifth, and sixth capture control regions (B1, B2, B3, B4), respectively.

Though not shown in the drawing, the controller 180 may cause storing of a focus image focused on each region based on a touch applied to the third, fourth, fifth, and sixth capture control regions (B1, B2, B3, B4).

According to the present embodiment, the user may receive a plurality of preview images having differently focused objects located on various regions of a preview image, allowing the user to selectively store at least one of the plurality of preview images.

Referring to FIG. 12B, the controller 180 causes displaying of first, second, third, and fourth zoom images 517*c*, 517*d*, 517*e*, 517*f* captured at different zoom magnifications in the third, fourth, fifth, and sixth capture control regions (B1, B2, B3, B4) based on a specific type of touch (for example, pinch-in touch input) applied to the seventh preview image 517 captured at the minimum capture magnification of the camera 121.

The controller 180 may control the touch screen 151 to display an indicator indicating that the first, second, third, and fourth zoom images 517*c*, 517*d*, 517*e*, 517*f* are being captured. Further, the controller 180 may cause selective storing of only a touch-applied zoom image based on a touch applied to the first, second, third, and fourth zoom images 517*c*, 517*d*, 517*e*, 517*f*.

According to the present embodiment, the user may check a plurality of images based on different zoom magnifications at once to selectively store them.

Referring to FIG. 12C, an edit image 605 is displayed along with the seventh preview image 517 based on a specific type of touch applied to the seventh preview image 517. The edit image 605 may be formed along an edge region of the touch screen 151, and may include a plurality of icons. The controller 180 may modify the seventh preview image 517 based on a touch consecutively applied from one icon of the edit image 605 to the seventh preview image 517 such that the touch screen 151 displays a modification image 517' of the seventh preview image 517 based on the touch.

The controller 180 controls the touch screen 151 to allow the edit image 605 to disappear based on an opposite touch (for example, pinch-out touch input) applied to a modification image 517'. Furthermore, the controller 180 may control the memory 170 to store the modification image 517' based on the opposite touch.

Further, the controller 180 stores the modification image 517', and then controls the touch screen 151 to redisplay a preview image currently acquired by the camera 121.

According to the present embodiment, the user may immediately modify and store a preview image acquired in real time by the camera.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a camera;
a touch screen; and
a controller operably coupled to the camera and the touch screen and configured to:
cause the touch screen to display an image received via the camera, the image acquired at a first magnification ratio;
control the camera to change a magnification ratio of the displayed image from the first magnification ratio to a second magnification ratio in response to a predetermined type of touch received via the touch screen displaying the image when the first magnification ratio is not a minimum magnification ratio;
cause the touch screen to display an image acquired at the second magnification ratio;
cause partitioning of the touch screen in response to a same predetermined type of touch received via the touch screen displaying the image acquired at the second magnification ratio, such that a plurality of regions are formed on the touch screen, when the second magnification ratio is the minimum magnification ratio; and control screen information displayed in each of the plurality of regions independently based on an individual touch received at each corresponding one of the plurality of regions.

2. The mobile terminal of claim 1, wherein:
the image acquired at the second or minimum magnification ratio is displayed in each of the plurality of regions; and
the mobile terminal further comprises a memory and the controller is further configured to:
cause the memory to store the image displayed in one of the plurality of regions in response to a touch received via the one of the plurality of regions; and
cause the touch screen to display another image received in real time via the camera in remaining regions among the plurality of regions such that the same image received in real time is displayed in each of the remaining regions while the image corresponding to the stored image remains to be displayed on the one of the plurality of regions.

3. The mobile terminal of claim 1, wherein the controller is further configured to:
control the camera to perform video capture with images consecutively received via the camera in response to a touch received via one of the plurality of regions; and
cause the touch screen to display a capture bar indicating time information associated with the video capture in the one of the plurality of regions.

4. The mobile terminal of claim 1, further comprising a memory, wherein the controller is further configured to:
cause the touch screen to display a capture icon on the touch screen partitioned into the plurality of regions; and
cause the memory to sequentially store each preview image displayed in each of the plurality of regions in response to a single touch received via the capture icon such that a plurality of images that are displayed together in the plurality of regions are captured at different time points to be stored after receiving the single touch via the capture icon.

5. The mobile terminal of claim 1, wherein:
each of the plurality of regions has a same size; and
the controller is further configured to cause the touch screen to display an image in each of the plurality of regions such that the image in each of the plurality of regions is displayed with a different visual effect.

6. The mobile terminal of claim 1, wherein the controller is further configured to cause the touch screen to:
display a plurality of graphic images corresponding to different functions such that each of the plurality of graphic images is displayed in a corresponding one of the plurality of regions; and
display an image to which a function corresponding to one of the plurality of graphic images is applied in response to a touch received via the corresponding one of the plurality of regions, the touch screen no longer in a partitioned state when the image to which the function is applied is displayed.

7. The mobile terminal of claim 1, wherein the controller is further configured to cause the touch screen to:
display the image acquired at the second or minimum magnification ratio in each of the plurality of regions;

display a frame select window comprising icons representing different types of frames for partitioning the touch screen in response to a first touch received via the touch screen partitioned into the plurality of regions; and display the image acquired at the minimum magnification ratio in each newly formed region on the touch screen in response to a second touch received via one of the icons, wherein a number of the newly formed regions and a size of each of the newly formed regions are determined based on one of the different types of frames selected in response to the second touch.

8. The mobile terminal of claim 1, wherein the controller is further configured to cause the touch screen to display one of the plurality of regions in a second size in response to a touch received via the corresponding one of the plurality of regions that is displayed in a first size.

9. The mobile terminal of claim 1, further comprising a wireless communication unit, wherein the controller is further configured to:
perform wireless communication with an external device having a camera via the wireless communication unit; and
cause the touch screen to display the image received via the camera in a first region among the plurality of regions and to display a second image received via the camera of the external device in a second region among the plurality of regions.

10. The mobile terminal of claim 9, wherein the controller is further configured to cause the camera of the external device to capture the second image in response to a touch received via the touch screen displaying the second image as a preview image.

11. The mobile terminal of claim 10, wherein the controller is further configured to cause the touch screen to display a panoramic image including the image captured by the camera and the second image captured by the camera of the external device.

12. The mobile terminal of claim 1, further comprising a second camera, wherein the controller is further configured to:
cause the touch screen to display the image received via the camera in a first region among the plurality of regions and to display a second image received via the second camera in a second region among the plurality of regions.

13. The mobile terminal of claim 12, wherein the controller is further configured to:
control activation of the second camera based on a drag touch received via either of the first and second regions;
activate the second camera when the drag touch is received in a first direction in the second region; and
deactivate the second camera when the drag touch is received in a second direction in the second region, causing the touch screen to display the image received via the camera in both the first and second regions.

14. The mobile terminal of claim 1, further comprising a memory, wherein the controller is further configured to cause the memory to store an image displayed on the touch screen in response to a touch received via the touch screen while a video file is generated with a plurality of images received via the camera.

15. The mobile terminal of claim 1, further comprising a memory, wherein the controller is further configured to:
cause the memory to store an image captured by the camera; and cause the touch screen to display the stored image and the image acquired at the second magnification ratio together on the partitioned touch screen.

16. The mobile terminal of claim 15, wherein the stored image displayed together with the image acquired at the second magnification ratio is associated with an object contained in the image acquired at the second magnification ratio.

17. The mobile terminal of claim 1, further comprising a wireless communication unit, wherein the controller is further configured to:
   receive information from a server via the wireless communication unit in response to the predetermined type of touch received via the touch screen displaying the image acquired at the second magnification ratio, the information related to an object contained in the image acquired at the second magnification ratio; and
   cause the touch screen to display the received information in a first region among the plurality of regions and to display the image acquired at the second magnification ratio in a second region among the plurality of regions.

18. A method for controlling a mobile terminal, the method comprising:
   displaying an image received via a camera on a touch screen, the image acquired at a first magnification ratio;
   controlling the camera to change a magnification ratio of the displayed image from the first magnification ratio to a second magnification ratio in response to a predetermined type of touch received via the touch screen displaying the image when the first magnification ratio is not a minimum magnification ratio;
   displaying an image acquired at the second magnification ratio on the touch screen;
   causing partitioning of the touch screen in response to a same predetermined type of touch received via the touch screen displaying the image acquired at the second magnification ratio, such that a plurality of regions are formed on the touch screen, when the second magnification ratio is the minimum magnification ratio; and
   controlling screen information displayed in each of the plurality of regions independently based on an individual touch received at each corresponding one of the plurality of regions.

* * * * *